(12) United States Patent
Inagaki et al.

(10) Patent No.: US 10,121,455 B2
(45) Date of Patent: Nov. 6, 2018

(54) ATTACHABLE DEVICE WITH FLEXIBLE ELECTRONIC DISPLAY ORIENTATION DETECTION

(71) Applicant: Polyera Corporation, Skokie, IL (US)

(72) Inventors: Philippe Inagaki, Chicago, IL (US); Hjalmar Edzer Ayco Huitema, Belmont, CA (US)

(73) Assignee: FLEXTERRA, INC., Skokie, IL (US)

( * ) Notice: Subject to any disclaimer, the term of this patent is extended or adjusted under 35 U.S.C. 154(b) by 0 days.

(21) Appl. No.: 15/233,932

(22) Filed: Aug. 10, 2016

(65) Prior Publication Data

US 2017/0098435 A1 Apr. 6, 2017

Related U.S. Application Data

(63) Continuation of application No. PCT/US2015/014964, filed on Feb. 9, 2015, which is
(Continued)

(51) Int. Cl.
*G09G 5/37* (2006.01)
*G06F 3/046* (2006.01)
(Continued)

(52) U.S. Cl.
CPC .............. *G09G 5/37* (2013.01); *G06F 1/163* (2013.01); *G06F 1/1643* (2013.01);
(Continued)

(58) Field of Classification Search
CPC ........ G06F 1/1652; G06F 1/163; G06F 3/014; G06F 2203/04102; G09F 9/301;
(Continued)

(56) References Cited

U.S. PATENT DOCUMENTS

| 4,834,376 A | 5/1989 | Steinberg |
| 5,065,376 A | 11/1991 | Choulat |

(Continued)

FOREIGN PATENT DOCUMENTS

| CN | 101180669 A | 5/2008 |
| CN | 101180864 A | 5/2008 |

(Continued)

OTHER PUBLICATIONS

"3M Flexible Transparent Touchscreen Concepts" video located on the Internet at http://www.youtube.com/watch?v=kCZz4lFok_o (uploaded Jan. 6, 2011).
(Continued)

*Primary Examiner* — Koosha Sharifi-Tafreshi
(74) *Attorney, Agent, or Firm* — Marshall, Gerstein & Borun LLP

(57) ABSTRACT

An attachable article includes a flexible electronic display disposed thereon in a manner so that the display is bendable or conformable to a user's wrist or other curved surface thus enabling various images to be displayed on the electronic display in a manner that makes these images easily viewable to the user. The attachable article includes an adjustable band that can be fit to different sized wrists, for example, and includes a band orientation detection and calibration routine that enables messages or display screens to be placed at particular locations on the band with respect to a user's wrist. For example, the routine may be used to determine the portions or positions of the display that are at the top of the user's wrist and at the bottom of the user's wrist, and may thereafter calibrate the display to center display screens on the display at these particular locations.

21 Claims, 12 Drawing Sheets

Related U.S. Application Data a continuation of application No. 14/188,440, filed on Feb. 24, 2014, now abandoned.

(60) Provisional application No. 61/938,107, filed on Feb. 10, 2014.

(51) Int. Cl.
  *G09G 5/00* (2006.01)
  *G09G 5/38* (2006.01)
  *G06F 1/16* (2006.01)
  *G06F 3/041* (2006.01)

(52) U.S. Cl.
  CPC .......... *G06F 1/1652* (2013.01); *G06F 1/1694* (2013.01); *G06F 3/046* (2013.01); *G06F 3/0412* (2013.01); *G09G 5/003* (2013.01); *G09G 5/38* (2013.01); *G06F 2203/04102* (2013.01); *G06F 2203/04105* (2013.01); *G09G 2300/0426* (2013.01); *G09G 2320/08* (2013.01); *G09G 2340/0492* (2013.01); *G09G 2354/00* (2013.01); *G09G 2380/02* (2013.01)

(58) Field of Classification Search
  CPC ............... A44C 5/0053; G09G 2380/02; H01L 2251/5338; H04M 1/0268; G04G 17/08; G04G 17/083; G04G 17/045
  USPC ............. 345/156, 173; 361/679.03; 368/281, 368/282, 223, 82
  See application file for complete search history.

(56) References Cited

U.S. PATENT DOCUMENTS

| | | |
|---|---|---|
| 5,162,696 A | 11/1992 | Goodrich |
| 5,438,488 A | 8/1995 | Dion |
| 5,438,851 A | 8/1995 | Geissbuhler |
| 5,644,858 A | 7/1997 | Bemis |
| 5,707,745 A | 1/1998 | Forrest et al. |
| 5,844,363 A | 12/1998 | Gu et al. |
| 5,889,737 A | 3/1999 | Alameh et al. |
| 5,930,026 A | 7/1999 | Jacobson et al. |
| 5,930,921 A | 8/1999 | Sorofman et al. |
| 6,011,309 A | 1/2000 | Ahn |
| 6,097,147 A | 8/2000 | Baldo et al. |
| 6,134,965 A | 10/2000 | Somville |
| 6,196,932 B1 | 3/2001 | Marsh et al. |
| 6,212,133 B1 | 4/2001 | McCoy et al. |
| 6,303,238 B1 | 10/2001 | Thompson et al. |
| 6,369,865 B2 | 4/2002 | Hinata |
| 6,503,188 B1 | 1/2003 | August |
| 6,577,496 B1 | 6/2003 | Gioscia et al. |
| 6,585,914 B2 | 7/2003 | Marks et al. |
| 6,608,323 B2 | 8/2003 | Marks et al. |
| 6,750,607 B2 | 6/2004 | Huitema et al. |
| 6,831,769 B2 | 12/2004 | Holman et al. |
| 6,837,590 B2 | 1/2005 | Marston |
| 6,839,158 B2 | 1/2005 | Albert et al. |
| 6,991,749 B2 | 1/2006 | Marks et al. |
| 7,170,670 B2 | 1/2007 | Webber |
| 7,180,665 B2 | 2/2007 | Daniel et al. |
| 7,209,114 B2 | 4/2007 | Radley-Smith |
| 7,278,093 B2 | 10/2007 | Jablonski et al. |
| 7,374,702 B2 | 5/2008 | Marks et al. |
| 7,384,814 B2 | 6/2008 | Huitema et al. |
| 7,446,945 B2 | 11/2008 | Kuiper et al. |
| 7,453,452 B2 | 11/2008 | Huitema et al. |
| 7,528,176 B2 | 5/2009 | Marks et al. |
| 7,564,436 B2 | 7/2009 | Huitema et al. |
| 7,569,693 B2 | 8/2009 | Marks et al. |
| 7,605,225 B2 | 10/2009 | Marks et al. |
| 7,667,962 B2 | 2/2010 | Mullen |
| 7,671,202 B2 | 3/2010 | Marks et al. |
| 7,710,370 B2 | 5/2010 | Slikkerveer et al. |
| 7,714,801 B2 | 5/2010 | Kimmel |
| 7,755,605 B2 | 7/2010 | Daniel et al. |
| 7,786,951 B2 | 8/2010 | Huitema et al. |
| 7,787,097 B2 | 8/2010 | Satoh |
| 7,787,917 B2 | 8/2010 | Aoki et al. |
| 7,816,480 B2 | 10/2010 | Marks et al. |
| 7,842,198 B2 | 11/2010 | Marks et al. |
| 7,892,454 B2 | 2/2011 | Facchetti et al. |
| 7,893,265 B2 | 2/2011 | Facchetti et al. |
| 7,902,363 B2 | 3/2011 | Facchetti et al. |
| 7,947,837 B2 | 5/2011 | Marks et al. |
| 7,956,820 B2 | 6/2011 | Huitema et al. |
| 7,965,258 B2 | 6/2011 | Aoki |
| 7,982,039 B2 | 7/2011 | Marks et al. |
| 8,017,458 B2 | 9/2011 | Marks et al. |
| 8,022,214 B2 | 9/2011 | Facchetti et al. |
| 8,077,283 B2 | 12/2011 | Van Veenendaal et al. |
| 8,097,877 B2 | 1/2012 | Marks et al. |
| 8,111,465 B2 | 2/2012 | Heikenfeld et al. |
| 8,117,903 B2 | 2/2012 | Golden et al. |
| 8,125,434 B2 | 2/2012 | Huitema et al. |
| 8,151,501 B2 | 4/2012 | Bemelmans et al. |
| 8,199,471 B2 | 6/2012 | Bemelmans et al. |
| 8,237,909 B2 | 8/2012 | Ostreko et al. |
| 8,279,166 B2 | 10/2012 | Huitema et al. |
| 8,325,143 B2 | 12/2012 | Destura et al. |
| 8,329,855 B2 | 12/2012 | Usta et al. |
| 8,334,545 B2 | 12/2012 | Levermore et al. |
| 8,358,275 B2 | 1/2013 | Huitema |
| 8,380,327 B2 | 2/2013 | Park |
| 8,395,150 B2 | 3/2013 | Marks et al. |
| 8,404,844 B2 | 3/2013 | Kastler et al. |
| 8,414,411 B2 | 4/2013 | Stites et al. |
| 8,440,828 B2 | 5/2013 | Quinn et al. |
| 8,446,549 B2 | 5/2013 | Huitema et al. |
| 8,466,851 B2 | 6/2013 | Huitema et al. |
| D686,217 S | 7/2013 | Andre |
| 8,474,146 B2 | 7/2013 | Hartford et al. |
| 8,477,250 B2 | 7/2013 | Schellingerhout et al. |
| 8,482,909 B2 | 7/2013 | Douglas |
| 8,493,714 B2 | 7/2013 | Visser et al. |
| 8,502,788 B2 | 8/2013 | Cho |
| 8,508,468 B2 | 8/2013 | Huitema |
| 8,508,920 B2 | 8/2013 | Huitema et al. |
| 8,514,213 B2 | 8/2013 | van Veenendaal et al. |
| 8,536,579 B2 | 9/2013 | Sele et al. |
| 8,537,104 B2 | 9/2013 | Markvoort et al. |
| 8,547,293 B2 | 10/2013 | Van Lieshout et al. |
| 8,547,325 B2 | 10/2013 | Huitema |
| 8,618,448 B2 | 12/2013 | Alexander |
| 9,176,530 B2 * | 11/2015 | Rothkopf ................ G06F 1/163 |
| 9,223,494 B1 | 12/2015 | DeSalvo et al. |
| 9,510,470 B2 | 11/2016 | Huitema et al. |
| 9,560,751 B2 | 1/2017 | Huitema et al. |
| 9,629,120 B2 | 4/2017 | Ryu et al. |
| 9,642,241 B2 | 5/2017 | Huitema et al. |
| 2001/0004808 A1 | 6/2001 | Hurwitz |
| 2002/0019296 A1 | 2/2002 | Freeman et al. |
| 2002/0027634 A1 | 3/2002 | Kang et al. |
| 2002/0070926 A1 * | 6/2002 | Kavanagh ............ G06F 3/0418 |
| | | 345/173 |
| 2003/0197597 A1 | 10/2003 | Bahl et al. |
| 2004/0052044 A1 | 3/2004 | Mochizuki et al. |
| 2004/0189605 A1 | 9/2004 | Shih |
| 2004/0212968 A1 | 10/2004 | Lin |
| 2004/0266496 A1 | 12/2004 | Kauhaniemi et al. |
| 2005/0110785 A1 | 5/2005 | Ochiai et al. |
| 2006/0020469 A1 | 1/2006 | Rast |
| 2006/0055691 A1 | 3/2006 | Bursett |
| 2006/0077127 A1 | 4/2006 | Sampsell et al. |
| 2006/0096392 A1 | 5/2006 | Inkster et al. |
| 2006/0132025 A1 | 6/2006 | Gao et al. |
| 2006/0202618 A1 | 9/2006 | Ishii et al. |
| 2006/0204675 A1 | 9/2006 | Gao et al. |
| 2006/0209218 A1 | 9/2006 | Lee et al. |
| 2006/0238494 A1 | 10/2006 | Narayanaswami et al. |
| 2006/0262098 A1 | 11/2006 | Okamoto |
| 2006/0273304 A1 | 12/2006 | Cok |
| 2007/0117600 A1 | 5/2007 | Robertson et al. |

(56) References Cited

U.S. PATENT DOCUMENTS

| | | |
|---|---|---|
| 2007/0120813 A1 | 5/2007 | Huitema et al. |
| 2007/0195067 A1* | 8/2007 | Zotov ............... G06F 3/04883 345/179 |
| 2007/0205997 A1 | 9/2007 | Lieshout et al. |
| 2007/0228952 A1 | 10/2007 | Kwon et al. |
| 2007/0279852 A1 | 12/2007 | Daniel et al. |
| 2008/0037374 A1 | 2/2008 | Chu et al. |
| 2008/0094314 A1 | 4/2008 | Huitema et al. |
| 2008/0100636 A1 | 5/2008 | Lai et al. |
| 2008/0150928 A1 | 6/2008 | Van Der Hoef et al. |
| 2008/0198184 A1 | 8/2008 | Schellingerhout et al. |
| 2008/0204367 A1 | 8/2008 | Lafarre et al. |
| 2008/0212271 A1 | 9/2008 | Misawa |
| 2008/0218369 A1 | 9/2008 | Krans et al. |
| 2008/0223746 A1 | 9/2008 | Van Rens et al. |
| 2008/0278472 A1 | 11/2008 | Huitema et al. |
| 2008/0291225 A1* | 11/2008 | Arneson ............... G06F 3/011 345/698 |
| 2008/0316580 A1 | 12/2008 | Gillies et al. |
| 2009/0067123 A1 | 3/2009 | Huitema et al. |
| 2009/0122007 A1 | 5/2009 | Tsuzaki et al. |
| 2009/0189878 A1 | 7/2009 | Goertz et al. |
| 2009/0197749 A1 | 8/2009 | Merkel et al. |
| 2009/0219225 A1 | 9/2009 | Cope |
| 2009/0251888 A1 | 10/2009 | Douglas |
| 2009/0267969 A1 | 10/2009 | Sakamoto |
| 2009/0290117 A1 | 11/2009 | Watanabe et al. |
| 2009/0296249 A1 | 12/2009 | van Lieshout et al. |
| 2010/0033435 A1 | 2/2010 | Huitema |
| 2010/0045705 A1 | 2/2010 | Vertegaal et al. |
| 2010/0050133 A1 | 2/2010 | Nishihara et al. |
| 2010/0117975 A1 | 5/2010 | Cho |
| 2010/0127965 A1 | 5/2010 | Park |
| 2010/0156868 A1 | 6/2010 | Hirayama |
| 2010/0164973 A1 | 7/2010 | Huitema et al. |
| 2010/0194785 A1 | 8/2010 | Huitema et al. |
| 2010/0231544 A1 | 9/2010 | Lu et al. |
| 2010/0238098 A1 | 9/2010 | Watanabe |
| 2010/0238612 A1 | 9/2010 | Hsiao et al. |
| 2010/0252112 A1 | 10/2010 | Watson |
| 2010/0259524 A1 | 10/2010 | Markvoort et al. |
| 2010/0283047 A1 | 11/2010 | Facchetti et al. |
| 2010/0295761 A1 | 11/2010 | van Lieshout et al. |
| 2010/0315225 A1 | 12/2010 | Teague |
| 2010/0320448 A1 | 12/2010 | Sele et al. |
| 2010/0326527 A1 | 12/2010 | Facchetti et al. |
| 2011/0003665 A1 | 1/2011 | Burton et al. |
| 2011/0043976 A1 | 2/2011 | Visser et al. |
| 2011/0048619 A1 | 3/2011 | Meinders et al. |
| 2011/0090155 A1 | 4/2011 | Caskey et al. |
| 2011/0109654 A1 | 5/2011 | Van Veenendaal et al. |
| 2011/0120558 A1 | 5/2011 | Facchetti et al. |
| 2011/0122593 A1 | 5/2011 | van Lieshout et al. |
| 2011/0124375 A1 | 5/2011 | Stuivenwold |
| 2011/0128260 A1 | 6/2011 | Huitema et al. |
| 2011/0128266 A1 | 6/2011 | Chiu et al. |
| 2011/0136333 A1 | 6/2011 | Facchetti et al. |
| 2011/0148797 A1 | 6/2011 | Huitema et al. |
| 2011/0157046 A1 | 6/2011 | Lee et al. |
| 2011/0185612 A1 | 8/2011 | Waggoner |
| 2011/0187681 A1 | 8/2011 | Kim et al. |
| 2011/0227855 A1* | 9/2011 | Kim ............... G02F 1/13306 345/173 |
| 2011/0256649 A1 | 10/2011 | Huitema et al. |
| 2011/0279442 A1 | 11/2011 | Hage et al. |
| 2011/0310035 A1 | 12/2011 | Kim et al. |
| 2012/0007796 A1 | 1/2012 | Jokinen et al. |
| 2012/0038861 A1 | 2/2012 | van Lieshout et al. |
| 2012/0080462 A1 | 4/2012 | Hajarian |
| 2012/0083705 A1 | 4/2012 | Yuen et al. |
| 2012/0086691 A1 | 4/2012 | van Lieshout et al. |
| 2012/0105333 A1 | 5/2012 | Maschmeyer et al. |
| 2012/0122519 A1 | 5/2012 | Jochheim |
| 2012/0162088 A1 | 6/2012 | van Lieshout et al. |
| 2012/0182282 A1 | 7/2012 | van Veenendaal et al. |
| 2012/0182755 A1 | 7/2012 | Wildner |
| 2012/0188750 A1 | 7/2012 | Marston |
| 2012/0194448 A1 | 8/2012 | Rothkopf |
| 2012/0194478 A1 | 8/2012 | Liu et al. |
| 2012/0212433 A1 | 8/2012 | Lee et al. |
| 2012/0223314 A1 | 9/2012 | Marks et al. |
| 2012/0242599 A1 | 9/2012 | Seo et al. |
| 2012/0264489 A1 | 10/2012 | Choi et al. |
| 2012/0283799 A1 | 11/2012 | Fan |
| 2012/0314546 A1 | 12/2012 | Brewer et al. |
| 2012/0327048 A1 | 12/2012 | Ramrattan et al. |
| 2013/0005404 A1 | 1/2013 | Bremer |
| 2013/0010405 A1 | 1/2013 | Rothkopf et al. |
| 2013/0025647 A1 | 1/2013 | Bouten et al. |
| 2013/0027853 A1 | 1/2013 | Chen et al. |
| 2013/0038622 A1 | 2/2013 | Yang |
| 2013/0044215 A1* | 2/2013 | Rothkopf ............... G06F 1/163 348/143 |
| 2013/0054997 A1 | 2/2013 | Wyatt et al. |
| 2013/0058063 A1 | 3/2013 | O'Brien |
| 2013/0062598 A1 | 3/2013 | Usta et al. |
| 2013/0070431 A1 | 3/2013 | Fukuma et al. |
| 2013/0076612 A1 | 3/2013 | Myers |
| 2013/0076649 A1 | 3/2013 | Myers et al. |
| 2013/0083496 A1 | 4/2013 | Franklin et al. |
| 2013/0106603 A1 | 5/2013 | Weast et al. |
| 2013/0113761 A1 | 5/2013 | van Lieshout et al. |
| 2013/0120106 A1 | 5/2013 | Cauwels et al. |
| 2013/0127690 A1 | 5/2013 | Tsai |
| 2013/0127748 A1 | 5/2013 | Vertegaal et al. |
| 2013/0127765 A1 | 5/2013 | Behdasht et al. |
| 2013/0128439 A1 | 5/2013 | Walters et al. |
| 2013/0131887 A1 | 5/2013 | Park |
| 2013/0141405 A1 | 6/2013 | Huitema et al. |
| 2013/0145522 A1 | 6/2013 | da Silva |
| 2013/0145795 A1 | 6/2013 | Asami |
| 2013/0154826 A1 | 6/2013 | Ratajczyk |
| 2013/0172068 A1 | 7/2013 | Zhou et al. |
| 2013/0182382 A1 | 7/2013 | Vardi et al. |
| 2013/0191741 A1 | 7/2013 | Dickinson et al. |
| 2013/0197680 A1 | 8/2013 | Cobbett et al. |
| 2013/0219332 A1 | 8/2013 | Woley et al. |
| 2013/0222208 A1 | 8/2013 | Gorilovsky et al. |
| 2013/0222270 A1 | 8/2013 | Winkler et al. |
| 2013/0222271 A1* | 8/2013 | Alberth ............... G06F 1/163 345/173 |
| 2013/0229373 A1 | 9/2013 | Eriksson et al. |
| 2013/0235008 A1 | 9/2013 | Kwon |
| 2013/0265257 A1 | 10/2013 | Jung et al. |
| 2013/0286466 A1 | 10/2013 | Lieshout et al. |
| 2013/0300779 A1 | 11/2013 | Van Baarsen et al. |
| 2013/0326790 A1* | 12/2013 | Cauwels ............... A44C 5/2071 2/170 |
| 2013/0335929 A1 | 12/2013 | Cavallaro |
| 2014/0042406 A1 | 2/2014 | Degner et al. |
| 2014/0049487 A1 | 2/2014 | Konertz et al. |
| 2014/0062892 A1 | 3/2014 | Dickinson et al. |
| 2014/0123015 A1 | 5/2014 | Sako et al. |
| 2014/0123436 A1 | 5/2014 | Griffin et al. |
| 2014/0138637 A1 | 5/2014 | Yang et al. |
| 2014/0226275 A1 | 8/2014 | Ko et al. |
| 2014/0257050 A1* | 9/2014 | Kuroda ............... A61B 5/0205 600/301 |
| 2015/0020081 A1 | 1/2015 | Cho et al. |
| 2015/0084892 A1 | 3/2015 | Shirota et al. |
| 2015/0089974 A1 | 4/2015 | Seo et al. |
| 2015/0124566 A1 | 5/2015 | Lake et al. |
| 2015/0162751 A1 | 6/2015 | Leabman et al. |
| 2015/0169011 A1 | 6/2015 | Bibl et al. |
| 2015/0185766 A1 | 7/2015 | Otsuka et al. |
| 2015/0185944 A1 | 7/2015 | Magi et al. |
| 2015/0227245 A1 | 8/2015 | Inagaki et al. |
| 2015/0333572 A1 | 11/2015 | Leabman |
| 2015/0378391 A1 | 12/2015 | Huitema et al. |
| 2015/0381793 A1 | 12/2015 | Cerda et al. |
| 2016/0014919 A1 | 1/2016 | Huitema et al. |
| 2016/0019703 A1 | 1/2016 | Tian |
| 2016/0037625 A1 | 2/2016 | Huitema et al. |
| 2016/0041581 A1 | 2/2016 | Piccionelli et al. |

(56) References Cited

U.S. PATENT DOCUMENTS

| | | |
|---|---|---|
| 2016/0041680 A1 | 2/2016 | Chi et al. |
| 2016/0062410 A1 | 3/2016 | Ko et al. |
| 2016/0142863 A1 | 5/2016 | Lam |
| 2016/0212837 A1* | 7/2016 | Kim .................. G06F 1/163 |
| 2016/0277891 A1 | 9/2016 | Dvortsov et al. |
| 2016/0283086 A1 | 9/2016 | Inagaki et al. |
| 2016/0299570 A1 | 10/2016 | Davydov |
| 2016/0322745 A1 | 11/2016 | Shedletsky et al. |
| 2016/0360618 A1 | 12/2016 | Elsherbini et al. |
| 2016/0379205 A1 | 12/2016 | Margadoudakis |
| 2017/0010751 A1* | 1/2017 | Shedletsky ........... G06F 3/0362 |
| 2017/0046931 A1 | 2/2017 | Hartweg et al. |
| 2017/0052749 A1 | 2/2017 | Lee |
| 2017/0235341 A1 | 8/2017 | Huitema et al. |

FOREIGN PATENT DOCUMENTS

| | | |
|---|---|---|
| DE | 202006012076 U1 | 10/2006 |
| EP | 1599110 A1 | 11/2005 |
| EP | 2551110 A1 | 1/2013 |
| FR | 2284149 A1 | 4/1976 |
| JP | 2013044293 A | 3/2013 |
| JP | 2013044294 A | 3/2013 |
| JP | 2013068292 A | 4/2013 |
| KR | 2011-0008118 U | 8/2011 |
| KR | 1256109 | 4/2013 |
| KR | 1278604 | 6/2013 |
| KR | 1301561 | 9/2013 |
| KR | 20150035232 A | 4/2015 |
| TW | M258364 U | 3/2005 |
| TW | M265636 U | 5/2005 |
| TW | 200815886 A | 4/2008 |
| TW | 201035934 A | 10/2010 |
| WO | WO-00/25193 A2 | 5/2000 |
| WO | WO-01/64070 A1 | 9/2001 |
| WO | WO-2004/047059 A1 | 6/2004 |
| WO | WO-2006/027727 A1 | 3/2006 |
| WO | WO-2006/085271 A2 | 8/2006 |
| WO | WO-2007/023406 A2 | 3/2007 |
| WO | WO-2007/042987 A1 | 4/2007 |
| WO | WO-2008/054206 A2 | 5/2008 |
| WO | WO-2012/156804 A1 | 11/2012 |
| WO | WO-2013/138003 A1 | 9/2013 |
| WO | WO-2015/023804 A1 | 2/2015 |

OTHER PUBLICATIONS

"Amazin Concept Holo Computer Elodie Delassus", Art, Concepts, Design, Gadgets, downloaded from the Internet at: http://designskings.com/amazin-concept-holo-computer-elodie-delassus/ (Jan. 18, 2012).

"Athletics and their supporters", Enlightened®: Illuminated Clothing by Janet Hansen, downloaded from the Internet at http://enlighted.com/pages/athletics.shtml (Aug. 8, 2013).

"E-Clock", Tokyoflash Japn Product Design Studio, downloaded from the Internet at http://blog.tokyoflash.com/2010/03/e-clock/ (Mar. 10, 2010).

"Features", Seg Sports Entertainment Gear, downloaded from the Internet at http://www.segshirts.com/features (Aug. 8, 2013).

"Flex Mobile, a Flexible Phone That Becomes a Bracelet, Some Other Wearable Piece of Gear", Concept Phones, downloaded from the Internet at http://www.concept-phones.com/tac/carolina-rebelo/ (Apr. 19, 2011).

"Flexible Smart Phone Fluid Presented by Philips", YouTube, downloaded from the Internet at http://www.youtube.com/watch?v=Wg9montNgbM&feature=player_detailpage (Apr. 2, 2012).

"iPING Putter App Cradle Attachment Case for iPhone 5", Carlsbad Golf Center, downloaded from the Internet at https://www.cocgolfshop.com/p-50-iping-putter-app-cradle-attachment-case-for-iphone-5.aspx (Aug. 8, 2013).

"Moment Smartwatch: World's First Wrap Around Smart Watch," Momentum Labs LLC, 28 pp. (Jun. 24, 2014).

"outEDGE iPhone 5 External 2800 mAH Battery Extender Case w/ Flip Screen Cover", outEDGEPOWER Products, downloaded from the Internet at http://www.outedgepower.com/outedge-iphone-5-external-2800-mah-battery-extender-case-w-flip-screen-cover/ (Aug. 8, 2013).

"Philips unveils world's first 'Rollable Display' pocket e-Reader concept READIUS", PHYS.org website(Sep. 1, 2005).

"Rohm shows a flexible-OLED wristband", OLED-Info.com, downloaded from the Internet at http://www.oled-info.com/rohm-shows-flexible-oled-wristband (Oct. 5, 2009).

"Samsung concept video for wearables and phones", YouTube screenshot, downloaded from the Internet at http://www.youtube.com/watch?v=ezrlwGwJGOs (Jul. 15, 2013).

"Samsung Galaxy X Concept Packs the Same Specs of teh Galaxy S II Plus a 12 MP Camera", Concept Phones website (May 15, 2011).

"Samsung Smart Watch Trademarks Filed, Wearable Internet Nearing Debut", Fox News Latino, downloaded from the Internet at http://latino.foxnews.com/latino/money/2013/08/07/samsung-smart-watch-trademarks-filed-wearable-internet-nearing-debut/ (Aug. 7, 2013).

"Sony Smartwatch 2 goes official: water-resistant, open API", phoneArena.com, downloaded from the Internet at http://www.phonearena.com/news/Sony-Smartwatch-2-goes-official-water-resistant-open-API_id44469 (Jun. 25, 2013).

"Taiwan Company to Begin Production of Large Format Flexible Electronic Paper Display Technology", Over the Wire, downloaded from the Internet at http://www.naylornetwork.com/ppi-otw/articles/?aid=219054&issueID=29119 (Aug. 8, 2013).

"Thermal Image Athletic Apparel", Trendhunter Lifestyle, downloaded from the Internet at http://www.trendhunter.com/trends/high-tech-athletic-apparel (Mar. 16, 2013).

"Wearable Concept Phone is Not Nokia 888", Concept Phones, downloaded from the Internet at http://www.concept-phones.com/faq/hyun-sung-lee/ (Jul. 18, 2008).

"What Will You Pop?", popSLATE, downloaded from the Internet at <http://www.popslate.com> (2012).

"Yuno Concept", TechPin, downloaded from the Internet at <http://www.techpin.com/yuno-concept/> (May 8, 2008).

Catacchio, "New OLED panel to bring bendable cell phones closer to reality?", TNW, downloaded from the Internet at http://thenextweb.com/asia/2010/10/04/new-oled-panel-to-bring-bendable-cell-phones-closer-to-reality/ (Oct. 4, 2010).

Cochrane et al., "Flexible displays for smart clothing: Part I—Overview", Indian Journal of Fibre & Textile Research, 36:422-8 (Dec. 2011).

Cooper, "Hands-on with Polymer Vision's e-ink Readius", engadget, downloaded from the Internet at http://www.engadget.com/2008/02/14/hands-on-with-polymer-visions-e-ink-readius/ (Feb. 14, 2008).

Crisp, "Rafael Nadal demonstrates Babolat Play & Connect interactive tennis racquet", gizmag, downloaded from the Internet at http://www.gizmag.com/rafael-nadal-demonstrates-babolat-play—connect-interactive-tennis-racquet/22699/ (May 26, 2012).

Eaton, "Nokia Morph Cellphone Rolls Up, Stretches, Cleans Itself", GIZMODO, downloaded from the Internet at http://gizmodo.com/360260/nokia-morph-cellphone-rolls-up-stretches-cleans-itself (Feb. 25, 2008).

Extended European Search Report for Application No. 14874426.1, dated Aug. 11, 2017.

Extended European Search Report for Application No. 14875486.4, dated Sep. 19, 2017.

Fingas, "Tentative Samsung smartwatch design unearthed in Korean patents", engadget, downloaded from the Internet at http://www.engadget.com/2013/08/03/tentative-samsung-smartwatch-designs-unearthed-in-korean-patents/ (Aug. 3, 2013).

First Chinese Office Action for Application No. 201480058291.8, dated Jul. 31, 2017.

Honig, "Pebble smartwatch review", engadget, downloaded from the Internet at <http://www.engadget.com/2013/01/25/pebble-smartwatch-review/> (Jan. 25, 2013).

(56) References Cited

OTHER PUBLICATIONS

Inofuentes, "Officially announced: LG G Flex and a healing factor", ars technica, downloaded from the Internet at http://arstechnica.com/gadgets/2013/10/officially-announced-lg-g-flex-and-a-healing-factor/ (Oct. 28, 2013).
International Preliminary Report on Patentability for Application No. PCT/US2016/019729, dated Sep. 8, 2017.
International Preliminary Report on Patentability, International Application No. PCT/US14/50972, dated Jan. 19, 2016.
International Preliminary Report on Patentability, International Application No. PCT/US14/52814, dated Mar. 1, 2016.
International Preliminary Report on Patentability, International Application No. PCT/US14/52957, dated Mar. 1, 2016.
International Preliminary Report on Patentability, International Application No. PCT/US14/55043, dated Mar. 15, 2016.
International Search Report and Written Opinion for Application No. PCT/US2016/019729, dated May 17, 2016.
International Search Report and Written Opinion, International Application No. PCT/US14/50972, dated Jan. 14, 2015.
International Search Report and Written Opinion, International Application No. PCT/US14/52814, dated Dec. 11, 2014.
International Search Report and Written Opinion, International Application No. PCT/US14/52957, dated Dec. 9, 2014.
International Search Report and Written Opinion, International Application No. PCT/US14/71859, dated Mar. 20, 2015.
International Search Report and Written Opinion, International Application No. PCT/US14/72172, dated Mar. 18, 2015.
International Search Report and Written Opinion, International Application No. PCT/US2014/055043, dated Jan. 27, 2015.
International Search Report and Written Opinion, International Application No. PCT/US2014/072313, dated Apr. 22, 2015.
International Search Report and Written Opinion, International Application No. PCT/US2014/072328, dated Apr. 22, 2015.
International Search Report and Written Opinion, International Application No. PCT/US2015/014964, dated May 14, 2015.
International Search Report and Written Opinion, International Application No. PCT/US2015/022691, dated Jul. 8, 2015.
International Search Report and Written Opinion, International Application No. PCT/US2015/026163, dated Jul. 20, 2015.
International Search Report and Written Opinion, International Application No. PCT/US2015/030254, dated Aug. 10, 2015.
International Search Report and Written Opinion, International Application No. PCT/US2015/030724, dated Aug. 14, 2015.
International Search Report and Written Opinion, International Application No. PCT/US2015/032799, dated Aug. 31, 2015.
Johan, "ASUS Waveface Ultra", techfresh.net, downloaded from the Internet at http://www.techfresh.net/asus-waveface-ultra/ (Jan. 19, 2010).
Kahn, "Is Apple's iWatch a slap wrist band with a flexible display?", 9to5Mac Apple Intelligence, downloaded from the Internet at http://9to5mac.com/2013/02/21/is-apples-iwatch-a-slap-wrist-band-with-a-flexible-display/ (Feb. 21, 2013).
Kaki, "10 Beautiful Nokia Concept Phones for Future Generations", DreamsRain website, downloaded from the Internet at http://www.dreamsrain.com/2011/09/18/10-beautiful-nokia-concept-phones-for-future-genrations/ (Sep. 18, 2011).
Kelvin, "Apple iBand Envisioned by T3: Health Features, Fitness and Watch Functions (Video)", Concept Phones, downloaded from the Internet at http://www.concept-phones.com/apple/apple-iband-envisioned-t3-health-features-fitness-watch-functions-video/ (Feb. 18, 2014).
Kelvin, "Apple iWatch 2 Concept by Jermaine Smit Lets You Change the Watch Bracelet Easily (Video)", Concept Phones, downloaded from the Internet at http://www.concept-phones.com/apple/apple-iwatch-2-concept-jermaine-smit-lets-change-watch-bracelet-easily-video/ (Mar. 5, 2014).
Kelvin, "Apple iWatch Concept Goes Back to Basics, Looks Like Nike Fuelband", Concept Phones, downloaded from the Internet at http://www.concept-phones.com/apple/apple-iwatch-concept-basics-nike-fuelband/ (Oct. 22, 2013).

Kelvin, "Apple iWatch Glass Hologram is an Overpowered Smartwatch (Video)", Concept Phones, downloaded from the Internet at http://www.concept-phones.com/apple/apple-iwatch-glass-hologram-overpowered-smartwatch-video/ (Apr. 19, 2014).
Kelvin, "Apple iWatch Goes Back to the Idea of an iPod Nano With a Belt", Concept Phones, downloaded from the Internet at http://www.concept-phones.com/apple/apple-iwatch-idea-ipod-nano-belt/ (Mar. 2, 2014).
Kelvin, "Finally, a HTC Smartwatch! We Needed Those!", Concept Phones, downloaded from the Internet at http://www.concept-phones.com/htc/finally-htc-smartwatch-needed/ (Feb. 4, 2014).
Kelvin, "Flexible Screen X Phone Becomes a Bracelet", Concept Phones, downloaded from the Internet at http://www.concept-phones.com/cool-concepts/flexible-screen-phone-bracelet/ (Oct. 28, 2013).
Kelvin, "HTC One Watch Render Seems Taken out of Tron", Concept Phones, downloaded from the Internet at http://www.concept-phones.com/htc/htc-watch-render-tron/ (Oct. 14, 2013).
Kelvin, "iPhone 6 and iWatch Pro Get Designed by Dani Yako", Concept Phones, downloaded from the Internet at http://www.concept-phones.com/apple/iphone-6-iwatch-pro-designed-dani-yako/ (Jun. 6, 2014).
Kelvin, "iWatch Concept is a Curved Bracelet, Runs Flappy Bird", Concept Phones, downloaded from the Internet at http://www.concept-phones.com/apple/iwatch-concept-curved-bracelet-runs-flappy-bird/ ( Feb. 13, 2014).
Kelvin, "iWatch Goliath is a Giant on Your Wrist (Video)", Concept Phones, downloaded from the Internet at http://www.concept-phones.com/apple/iwatch-goliath-giant-wrist-video/ (May 23, 2014).
Kelvin, "iWatch Render Goes the Way of the Nike FuelBand", Concept Phones, downloaded from the Internet at http://www.concept-phones.com/apple/iwatch-render-nike-fuelband/ (Jan. 21, 2014).
Kelvin, "Meizu MWatch Render is Exactly What Smartwatches Need", Concept Phones, downloaded from the Internet at http://www.concept-phones.com/cool-concepts-meizu-mwatch-render-smartwatches/ (Feb. 12, 2014).
Kelvin, "MWC 2014: Kyocera Showcases Flexible Phone That Turns Into Bracelet", Concept Phones, downloaded from the Internet at http://www.concept-phones.com/kyocera/mwc-2014-kyocera-showcases-flexible-phone-turns-bracelet/ (Feb. 27, 2014).
Kelvin, "New Apple Watch Render Shows us an Ultrathin Bracelet", Concept Phones, downloaded from the Internet at <http://www.concept-phones.com/apple/apple-iwatch-render-shows-ultrathin-bracelet/> (Oct. 16, 2013).
Kelvin, "NewiWatch Design Brings Us Back the Basics of a Watch", Concept Phones, downloaded from the Internet at http://www.concept-phones.com/apple/iwatch-design-brings-basics-watch/ (Apr. 29, 2014).
Kelvin, "Nokia Lumia 101 Smartwatch is a Nice Little, Elegant Bracelet", Concept Phones, downloaded from the Internet at http://www.concept-phones.com/nokia/nokia-lumia-101-smartwatch-nice-elegant-bracelet/ (Dec. 3, 2013).
Kelvin, "Superb Google Smartwatch Render Created in Cinema 4D", Concept Phones, downloaded from the Internet at http://www.concept-phones.com/google/superb-google-smartwatch-render-created-cinema-4d/ (Jan. 31, 2014).
Kim,"Analysis of iWatch-related Patents from RitFast", IHS Technology, downloaded from the Internet at http://www.displaybank.com/letter/letter_contents.php?nm=&email=prakash%40polyera.com&mail_id=8995 (Jul. 19, 2013).
Lilienthal, "Book? Accordian? Nope. Lumino is a Gorgeous LED Lamp the Goes Wherever You Do," Digital Trends, 6 pp. (Apr. 27, 2014).
Non-Final Office Action from U.S. Appl. No. 14/188,440 dated Aug. 14, 2015.
Office Action for U.S. Appl. No. 15/054,725, dated Aug. 23, 2017.
Rastogi, "Nokia Lumia 1080: The Concept Phone", 91 mobiles, downloaded from the Internet at http://www.91mobiles.com/blog/nokia-lumia-1080-the-concept-phone.html (Jun. 27, 2013).
Ridden, "Emopulse Smile SmartWatch goes up for pre-order", Gizmag, downloaded from the Internet at http://www.gizmag.com/emopulse-smile-smartwatch/27984/ (Jun. 19, 2013).

(56) References Cited

OTHER PUBLICATIONS

Seth, "In 2020 We Can Wear Sony Computers on Our Wrist", Yanko Design Form Beyond Function, downloaded from the Internet at http://www.yankodesign.com/2010/05/25/in-2020-we-can-wear-sony-computers-on-our-wrist/ (May 25, 2010).
Seth, "Love This iWatch!", Yanko Design Form Beyond Function, downloaded from the Internet at http://www.yankodesign.com/2013/07/26/love-this-iwatch/ (Jul. 26, 2013).
Seth, "My Latest Fashion Accessory", Yanko Design Form Beyond Function, downloaded from the Internet at http://www.yankodesign.com/2009/08/11/my-latest-fashion-accessory/ (Aug. 11, 2009).
Seth, "Super Sexy Roll", Yanko Design Form Beyond Function, downloaded from the Internet at http://www.yankodesign.com/2011/03/21/super-sexy-roll/ (Mar. 21, 2011).
Smith, "Flexi E Ink screen finds home in curved world time watch", The Register, downloaded from the Internet at http://www.theregister.co.uk/2010/10/11/phosphor_watches_world_time/ (Oct. 11, 2010).
Smith, "Samsung smartwatch concept shown in patent hints at flexible display use", Android Authority (Aug. 3, 2013).
Smith, "Samsung's curved smartphone is the Galaxy Round, launches in Korea tomorrow (video)", engadget, downloaded from the Internet at http://www.engadget.com/2013/10/08/samsung-galaxy-round/ (Oct. 8, 2013).
Thrystan, "Apple iWatch 2 Design Appears, More Elegant Than Ever", Concept Phones, downloaded from the Internet at http://www.concept-phones.com/apple/apple-iwatch-2-design-appears-elegant/ (Feb. 9, 2012).
Thrystan, "BenQ Siemens Snake Concept Phone is Yet Another Bracelet-Handset", Concept Phones, downloaded from the Internet at http://www.concept-phones.com/benq-siemens/benq-siemens-snake-concept-phone-bracelethandset/ (Feb. 9, 2009).
Thrystan, "Bracelet Phone Concept Incorporates an MP3 Player, Shines Like a Diamond", Concept Phones, downloaded from the Internet at http://www.concept-phones.com/fashion-phones/bracelet-phone-concept-incorporates-mp3-player-shines-diamond/ (Sep. 8, 2008).
Thrystan, "CEATEC 2010 Hosts TDK's Flexible OLED Displays; Hands-on Photos Here!", Concept Phones, downloaded from the Internet at http://www.concept-phones.com/news/ceatec-2010-hosts-tdks-flexible-oled-displays-handson-photos/ (Oct. 5, 2010).
Thrystan, "Dyson Concept Phone Charger Turns Temperature Differences Into Electricity", Concept Phones, downloaded from the Internet at http://www.concept-phones.com/cool-concepts/dyson-concept-phone-charger-turns-temperature-differences-electricity/ (Jul. 24, 2009).
Thrystan, "Email Beeper Watch is Hip, Restarts a Trend", Concept Phones, downloaded from the Internet http://www.concept-phones.com/cool-concepts/email-beeper-watch-hip-restarts-trend/ (Mar. 3, 2009).
Thrystan, "Flux, Portable and Wearable PC Concept", Concept Phones, downloaded from the Internet at http://www.concept-phones.com/eco-friendly/flux-portable-and-wearable-pc-concept/ (May 5, 2008).
Thrystan, "Fujitsu Concept Phones Part 2: Judge-Dredd-Like Curvy Handset", Concept Phones, downloaded from the Internet http://www.concept-phones.com/fujitsu/fujitsu-concept-phones-part-2-judgedreddlike-curvy-handset/ (Oct. 10, 2009).
Thrystan, "iPhone 5 Bracelet Looks Out of this World", Concept Phones, downloaded from the Internet at http://www.concept-phones.com/apple/iphone-5-bracelet-world/ (Jul. 6, 2012).
Thrystan, "iPhone Holographic Display Concept is Surreal, Could Work", Concept Phones, downloaded from the Internet at http://www.concept-phones.com/apple/iphone-holographic-display-concept-surreal-work/ (Aug. 22, 2009).
Thrystan, "iWatch Design Created by James Ivaldi is All Metal", Concept Phones, downloaded from the Internet at http://www.concept-phones.com/apple/iwatch-design-created-james-ivaldi-metal/ (Jul. 29, 2013).
Thrystan, "iWatch Render in the Vision of the Ciccarese Design Team: Simply Stunning (Video)", Concept Phones, downloaded from the Internet at http://www.concept-phones.com/apple/iwatch-render-vision-ciccarese-design-team-simply-stunning-video/ (Aug. 21, 2013).
Thrystan, "Leaf Phone Features an Organic Structure, is Made of Eco-Friendly Plastic," Concept Phones, downloaded from the Internet at http://www.concept-phones.com/eco-friendly/leaf-phone-features-organic-structure-ecofriendly-plastic/ (Nov. 4, 2009).
Thrystan, "LG Auki Bracelet Phone Is Colorful and Elegant", Concept Phones, downloaded from the Internet at http://www.concept-phones.com/lg/lg-auki-bracelet-phone-colorful-elegant/ (Aug. 26, 2011).
Thrystan, "LG Helix Cellphone is Also a Slap Bracelet", Concept Phones, downloaded from the Internet at http://www.concept-phones.com/lg/lg-helix-cellphone-slap-bracelet/ (Oct. 9, 2009).
Thrystan, "LG Oyster, a Bracelet-Like Mobile Phone Design", Concept Phones, downloaded from the Internet at http://www.concept-phones.com/lg/lg-oyster-braceletlike-mobile-phone-design/ (Jul. 26, 2009).
Thrystan, "New iWatch Render by Tolga Tuncer is Fancy and Classy", Concept Phones, downloaded from the Internet at http://www.concept-phones.com/apple/iwatch-render-tolga-tuncer-fancy-classy/ (Mar. 3, 2013).
Thrystan, "Nokia Mixed Reality Concept, Future Technology Demoed at Nokia World (Video)", Concept Phones, downloaded from the Internet at http://www.concept-phones.com/nokia/nokia-mixed-reality-concept-future-technology-demoed-nokia-world-video/ (Sep. 9, 2009).
Thrystan, "Nokia Open Bracelet Shows Incoming Calls of the Ones You Love", Concept Phones, downloaded from the Internet at http://www.concept-phones.com/nokia/nokia-open-bracelet-shows-incoming-calls-love/ (Dec. 13, 2008).
Thrystan, "Nokia Smart Watch Concept Looks Interesting", Concept Phones, downloaded from the Internet at http://www.concept-phones.com/uncategorized/nokia-smart-watch-concept-interesting/ (Oct. 22, 2011).
Thrystan, "Purse Bracelet Fancy Concept Phone, Designed by Yw Li", Concept Phones, downloaded from the Internet at http://www.concept-phones.com/fashion-phones/purse-bracelet-fancy-concept-phone-designed-yw/ll/ (Oct. 19, 2008).
Thrystan, "Quartz Tele Concept Should be in a Final Fantasy Game, Because It's All About Crystals", Concept Phones, downloaded from the Internet at http://www.concept-phones.com/fashion-phones/quartz-tele-concept-final-fantasy-game-crystals/ (Sep. 8, 2008).
Thrystan, "Samsung Finger Touching Cellphone Concept Comes in Handy", Concept Phones, downloaded from the Internet at http://concept-phones.com/samsung/samsung-finger-touching-cellphone-concept-handy/ (Jan. 31, 2009).
Thrystan, "Samsung Futuristic Technology Relies on Health and Flexibility (Video)", Concept Phones, downloaded from the Internet at http://www.concept-phones.com/samsung/samsung-futuristic-technology-relies-health-flexibility-video/ (Jul. 10, 2013).
Thrystan, "Samsung S-Health Bracelet Render is Based on Tizen OS", Concept Phones, downloaded from the Internet at http://www.concept-phones.com/samsung/samsung-shealth-bracelet-render-based-tizen-os/ (Jun. 17, 2013).
Thrystan, "Sony Ericsson Bracelet Phone, a Design That Won't Make It Into Production", Concept Phones, downloaded from the Internet at http://www.concept-phones.com/sony-ericsson/sony-ericsson-bracelet-phone-design-production/ (Jun. 19, 2009).
Thrystan, "Sony Ericsson Ring Phone Concept by Tao Ma Will Always Be a Winner", Concept Phones, downloaded from the Internet at http://www.concept-phones.com/sony-ericsson/sony-ericsson-ring-phone-concept-tao-ma-winner/ (Sep. 15, 2008).
Thrystan, "Speak to Me Concept Watch Phone is Hot, a Must-Have Fashion Accessory", Concept Phones, downloaded from the Internet at http://www.concept-phones.com/fashion-phones/speak-concept-watch-phone-hot-musthave-fashion-accessory/ (Jan. 27, 2009).
Thrystan, "The Hook Bracelet Phone Concept Runs Windows Phone in a New Format", Concept Phones, downloaded from the Internet at http://www.concept-phones.com/cool-concepts/hook-bracelet-phone-concept-runs-windows-phone-format/ (Jun. 21, 2013).

(56) References Cited

OTHER PUBLICATIONS

Thrystan, "The New iPod is iBangle . . . iLike iT", Concept Phones, downloaded from the Internet at http://www.concept-phones.com/apple/ipod-ibangle-ilike/ (Oct. 23, 2008).

Thrystan, "Xbox 720 Concept is a Pyramid With Two Kinect "Eyes"", Concept Phones, downloaded from the Internet at http://www.concept-phones.com/microsoft/xbox-720-concept-pyramid-kinect-eyes/ (Jul. 8, 2013).

Thrystan, "Yuxa is a Wearable Cellphone Made From Eco-Friendly Materials", Concept Phones, downloaded from the Internet at http://www.concept-phones.com/eco-friendly/yuxa-wearable-cellphone-ecofriendly-materials/ (Jun. 24, 2010).

Thrystan, "ZTE Cube Phone, Another Mobile World Congress Concept", Concept Phones, downloaded from the Internet at http://www.concept-phones.com/cool-concepts/zte-cube-phone-another-mobile-world-congress-concept/ (Feb. 14, 2008).

Vertegaal et al., "Organic User Interfaces have non-planar displays that may actively or passively change shape via analog physical inputs", Organic User Interfaces—Communications of the ACM (May 31, 2008).

Wei et al., Shape memory materials and hybrid composites for smart systems, Part II: Shape-memory hybrid composites, J. Mater. Sci., 33:3763-83 (1998).

Extended European Search Report for Application No. 14875752.9, dated Aug. 1, 2017.

Office Action for Taiwanese Application No. 103129521, dated Apr. 9, 2018.

First Office Action received in corresponding Chinese Application No. 2014/180076308.2 dated Jun. 29, 2018.

First Office Action received in corresponding Chinese Application No. 2014/80076314.8 dated Jun. 28, 2018.

\* cited by examiner

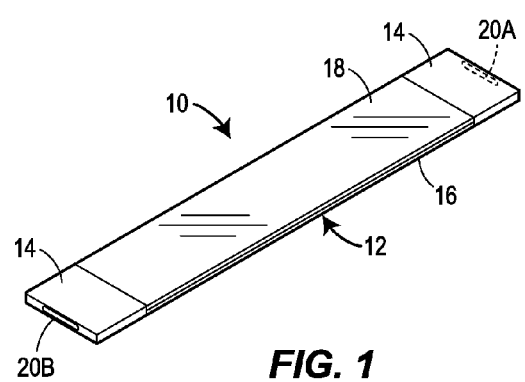
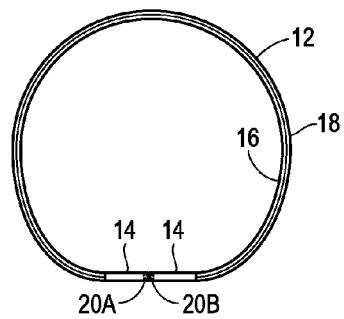
FIG. 1
FIG. 2
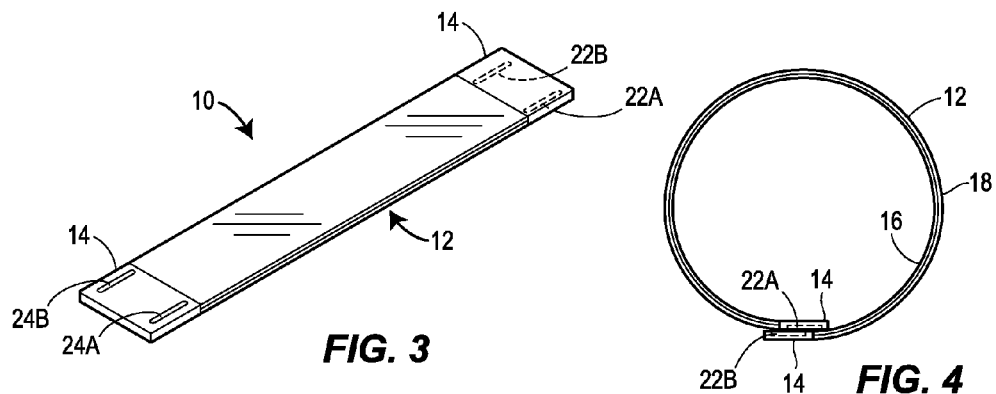
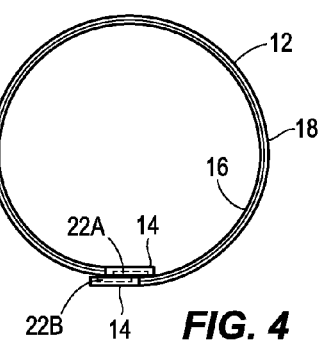
FIG. 3
FIG. 4

ATTACHABLE DEVICE WITH FLEXIBLE ELECTRONIC DISPLAY ORIENTATION DETECTION

RELATED APPLICATIONS

This application is a continuation application of International Patent Application No. PCT/US2015/014964 filed on Feb. 9, 2015, which claims priority to and the benefit of the filing dates of: U.S. Provisional Patent Application Ser. No. 61/938,107 entitled "Attachable Device with Flexible Display and Orientation Detection" which was filed on Feb. 10, 2014, and U.S. patent application Ser. No. 14/188,440 entitled "Attachable Device with Flexible Electronic Display Orientation Detection" which was filed on Feb. 24, 2014, the entire disclosures of which are hereby expressly incorporated by reference herein.

TECHNICAL FIELD

This patent relates generally to electronic displays, and more particularly to flexible electronic displays incorporated into or disposed on adjustable bands, such as wrist bands, to provide consistent display and messaging functions to wearers of the bands.

BACKGROUND

Electronic displays are commonly installed within flat, hard surfaces of electronic devices, such as computer screens, television sets, smart phones, tablet computers, etc., and in many cases are installed on accessories for the electronic devices, such as removable monitors. Many electronic devices having an electronic display are portable, and have thus become very useful in implementing mobile applications. This fact is particularly true with smart phones which have become ubiquitous. However, unfortunately, typical mobile devices such as smart phones have electronic displays that are flat and rigid in nature. Thus, while these displays are useful in implementing many different applications, the device on which the display is present must still typically be held in a hand, or must be stored in a pocket, a purse, a briefcase or other container, which makes the electronic device less accessible in many situations, such as when a person is carrying other items, undertaking an athletic activity such as running, walking, etc. Moreover, in many cases these traditional electronic devices require two free hands to hold and operate, making these devices cumbersome or difficult to use or to view in situations in which, for example, a person has only one or no free hands or is otherwise occupied.

While flexible electronic displays are generally known and are starting to come into more common usage, flexible electronic displays have not been widely incorporated into easily portable items such as items of clothing, wristbands, armbands, jewelry, etc. or on items that are easily attached to other items, much less in a manner that makes the electronic display more useable and visible to the user in many different scenarios.

SUMMARY

An attachable article, such as a band or a wristband, includes a flexible electronic display disposed thereon in a manner so that the flexible electronic display is bendable or conformable to a user's wrist or other curved or even flat surface, thus enabling various images to be displayed on the electronic display in a manner that is easily viewable to a user. The attachable article with such a flexible electronic display may be attached to or worn on a user's body, such as in the form of a wristband, an armband, a leg band, or a belt, and may bend to fit the various contours or body surfaces on which the electronic display is located. The attachable article is also easily attached to other items, such as mugs, cups, computers, phone covers, bike handles, automobile dashboards, etc., that enable the flexible electronic display to be viewed when not being held in or attached to one's hands or arms. The electronic display of the attachable article is thus, in many cases, viewable to a user and is capable of being manipulated or actuated by the user without having to be held in one or both of the user's hands, making the electronic device useable while the user is engaged in or performing other activities, such as running, biking, etc.

In one case, the attachable electronic device includes a flexible electronic display disposed on a flexible, e.g., bendable, substrate in the form of a generally rectangular shape, with one or two end pieces or clasps attached to the substrate. For the sake of simplicity, such a substrate will be generally referred to herein as a band or as part of a band, but includes other shapes besides an elongated rectangular substrate. Various electronics are disposed in the one or more electronic modules that may be within, for example, one or both of the end pieces of the band, or in a separate electronics module disposed in between the two ends of the band with the electronics module including a display driver for driving the electronic display to display fixed or changeable messages, artwork, pictures, etc. The electronic module may also include a processor for implementing applications or programming and a memory for storing pictures, images, messages, videos, etc. to be displayed on the electronic display at various times, as well as for storing applications and application data, such as configuration data, to be used by applications for performing various display tasks at different times. The electronic module may also include a battery for powering the electronic display, the processor, the display driver, and other electronic elements, a battery charging device for charging the battery either in a wireless or a wired manner, and a communications module that enables other computer devices to communicate with the processor, the display driver and the memory to provide new or different images or messages to be displayed on the electronic display, to configure the operation of the electronic display of the attachable electronic device, etc.

The flexible electronic display may be fabricated using any desired flexible electronic display material, such as any of various suitable plastics. If desired, the flexible electronic display may be manufactured as a display having pixel elements disposed on separate frontplane and backplane substrates formed of the same or different flexible material. In some cases, such as the case in which e-paper is used as the flexible electronic display, a separate layer of material may be disposed between the frontplane and the backplane materials to form pixel elements. In any case, these substrate materials may be placed together to form the flexible electronic display, which may then be disposed on the flexible substrate, such as a leather substrate, a bendable metal substrate, etc., the combination of which can be flexed or curved in various manners to conform to the shape of a portion of a wearer's body, such as a wrist, a leg, a waist, a foot, etc. or to conform to the shape of other items to which the attachable article may be attached. In another case, the attachable electronic device may include a flexible, for example, transparent, touchscreen interface disposed over or on top of the flexible electronic display to enable a user to input data or take input actions with respect to the flexible electronic display. In some cases, the inputs may be in the form of gestures that cause the electronic device to operate in a predetermined manner, to change modes of operation, etc. In addition or instead, the attachable electronic device may include one or more pressure sensors, such as strain gauges or other pressure sensors, magnetic sensors, or other sensors that detect pressure or touch actions applied to the band at various locations on the band. In still other cases, the attachable electronic device may include on or more gyroscopes or other sensors capable of detecting the orientation of the band or the electronics module on the band with respect to the force of gravity, acceleration, etc.

The electronic display device, so formed may, for example, enable a user to have a single type or multiple different types of digital media depicted or displayed on the display at the same time, including, for example, photographs, digital artwork created by the user or others, messages sent to or created by the user, reminders, notes that provide instructive, educational or inspirational messages, e-cards, advertisements, personalized agendas, calendars, such as a personalized Outlook® calendar, etc.

More particularly, the display driver may be configurable to drive the electronic display by displaying thereon one or more images, messages, digital artwork, videos, etc., stored in the memory. The display driver may display a fixed image via the flexible electronic display, may change the one or more images being displayed on the flexible electronic display from time to time, such as by accessing the memory and providing a new image to the display, may display videos, such as real time videos, and/or may display other types of digital media. Likewise, the display driver may display various interfaces or display screens associated with many different applications at the same or at different times or in different modes of the attachable electronic device. For example, the display driver may be driven by various different applications run in a processor to display a calendar interface, an e-mail in-box interface, an alarm clock interface, a keyboard interface, a step-counter interface, etc. These interfaces may be located on the same place on the flexible electronic display and displayed at different times and may be located at different places on the flexible electronic display and displayed at the same or at different times.

In many cases, the band of the attachable article will be adjustable in nature such that the band can be fit or placed on or around different sized wrists, arms, legs, waists, etc. and thus overlap upon itself more or less depending on the size of the wrist, arm, leg, etc. In one case, the electronics module of the attachable article may operate in conjunction with one or more sensors, such as a touchscreen, pressure sensors, strain gauges, gyroscopes, etc., disposed on or in the band or the electronics module, to detect the orientation of the band when the band is disposed around, for example, a user's wrist, to enable different images to be displayed at specific locations with respect to the user's wrist (such as directly on the top of the wrist or directly on the bottom of the wrist, etc.) In this case, the electronics module may use the sensors to detect the portion of the band that is at or adjacent to one or more specific locations on the wrist, such as directly on top the wrist or directly on the bottom of the wrist and may, thereafter, configure the flexible electronic display of the attachable article to, for example, center particular screens at one or more of these locations. In one case display screens may be categorized as displaying public information or private information, so that display screens providing public information (such as artwork or other artistic images, time/date information, etc.) are centered on the band at the top of the user's wrist or at the outer side of the user's wrist, while display screens that include or display private information (such as e-mail messages, text messages, etc.) are automatically centered on the bottom of the user's wrist or on the inner side of the user's wrist. If desired, an electronics module may implement a band orientation detection and calibration routine to determine which portions of the electronic display or band are located at particular portions of a user's wrist, for example, to enable the device to display public and private display screens at fixed locations with respect to a user's wrist, even when the band is adjusted in length to fit different sized wrists.

BRIEF DESCRIPTION OF THE DRAWINGS

FIG. 1 is a perspective view of an example attachable article in the form of a wristband having a flexible electronic display disposed thereon and a first type of magnetic clasp.

FIG. 2 is a side view of the wristband of FIG. 1 bent to form a fixed length wristband.

FIG. 3 is a perspective view of an example attachable article in the form of a wristband having a flexible electronic display disposed thereon with a second type of magnetic clasp.

FIG. 4 is a side view of the example attachable article of FIG. 3 bent to form an adjustable length wristband.

DETAILED DESCRIPTION

Figure 5A:
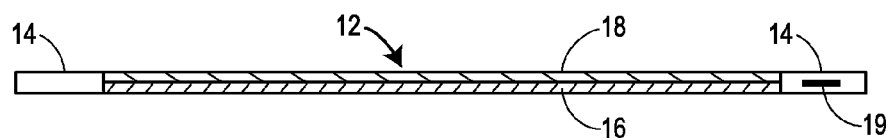
FIG. 5A is a side view of an example attachable article of FIG. 1 having a flexible electronic display disposed on a flexible substrate between two clasps.

Referring now to FIG. 1, an attachable article 10 in the form of a wristband device includes a flexible band portion 12, which is generally rectangular in shape and configuration, disposed between two end pieces or clasps 14. The band portion 12 includes a flexible substrate 16 and a flexible electronic display 18 disposed on the substrate 16 to be viewable from the top of the band 12, as illustrated in FIG. 1. One or more of the end pieces or clasps 14, each of which may be made of hard plastic or other rigid material, but could instead be made of a pliable material, may include various electronic components therein for driving the flexible electronic display 18 and for providing other electronic functionality for the article 10.

As illustrated in FIG. 1, one or both of the end pieces or clasps 14 may include a connection structure therein that functions to connect the end pieces 14 together when the band portion 12 is bent, as illustrated in FIG. 2, to form a circular or oval band. In one case, the connection structure may be in the form of a magnetic material 20A and 20B disposed in or on each of the clasps 14, wherein the materials 20A and 20B operate, when in close proximity to one another, to hold the end pieces or clasps 14 together. The magnetic materials 20A and 20B can each be a permanent magnet, or one of the materials 20A or 20B can be a permanent magnet while the other material 20A or 20B can be a magnetically permeable material, such as many kinds of metal. The magnetic material 20A and 20B can be disposed at the longitudinal ends of the clasps 14 so that the clasps 14 connect end-to-end when the band 12 is bent to allow the clasps 14 to meet up with each other end-to-end, as illustrated in FIG. 2. In the case in which the materials 20A and 20B are both permanent magnets, the materials 20A and 20B may be disposed in ends of the clasps 14 so that opposite poles of the permanent magnets are facing outwardly from the clasps 14 or so that the magnets have their respective north poles facing in opposite directions when the band portion 12 is bent in the manner shown in FIG. 2 (e.g., so that a south pole of one of the magnets 20A and 20B meets or mates with a north pole of the other one of the magnets 20A and 20B). As will be understood, the configuration and placement of the materials 20A and 20B in the clasps 14 in the manner illustrated in FIG. 1 enables the wristband device 10 to be clasped in a continuous circle with a fixed or predetermined length so that the clasps 14 meet end-to-end.

In another embodiment illustrated in FIG. 3, the flexible attachable article 10, again illustrated in the form of a wristband, includes a similar band portion 12 and end pieces or clasps 14. However, in this case, the clasps 14 have connection structure in the form of magnets disposed on the top or bottom sides of the clasps 14 (and possibly even a portion of the band 12) to enable the wristband device 10 to be folded around on itself in an adjustable manner as illustrated in FIG. 4, so as to create a wristband of variable length when disposed around or connected around a wrist. As illustrated in FIGS. 3 and 4, magnets or magnetic members 22A and 22B are disposed on or near a lower side of one the clasps 14, and come into contact or react with magnets or magnetic members 24A and 24B disposed on or near an upper side of the other one of the clasps 14. In this manner, the clasps 14 may be disposed near or on top of one another during use and are thus connectable in various different positions with respect to one another, such as that illustrated in FIG. 4, when the flexible band 12 is bent to form a generally circular or oval member to be placed around a wrist, a leg, a bicycle handle bar, etc., for example. In this manner, the wristband 10 may be easily adjustable in size to fit various different sized mounting members. As illustrated in FIG. 4, the substrate or flexible material 16 of the band portion 12 is illustrated as being flexed in a manner that causes the flexible electronic display 18 to be disposed on the exterior or outside of the band portion 12. Of course, in the configuration illustrated in FIG. 4, the magnets or metallic members 22A and 22B on the one side, and the magnets or the metallic members 24A and 24B on the other side of the band portion 12 may slide with respect to one another in the longitudinal direction of the wristband 10 so as to make the wristband 10 variable in size or circular shape to fit around different sized wrists or other mounting members. Of course, if desired, portions of the members 22A, 22B and/or 24A, 24B could be disposed in the band portion 12 in addition to or instead of in the clasps 14 and, if so disposed, could still be considered as being disposed in the end portions of the band 12. Still further, any or all of the magnetic members 22A, 22b, 24A, 24B could be a single, long piece of material, as illustrated in FIGS. 3 and 4, or could be a series of magnetic members disposed near but not contacting each other, to enable better registration of the north and south poles of the respective magnetic members in various different longitudinal locations of the band 12. This second configuration may provide for better adjustability of the length of the band 12 when both magnetic members 22 and 24 are permanent magnets. Likewise, while the band portion 12 is illustrated as including two end pieces, one or both of which may encapsulate an electronics module that holds the electronics used to drive the flexible electronic display 18, a single piece may be used to encapsulate the electronics module and this piece or electronics module may be located anywhere along the length of the band portion 12, including in the middle of the band portion 12, at a distance that is about one third of the entire length of the band portion 12 from one end of the band portion 12 and two-thirds of the entire length of the band portion 12 from the other side of the band portion 12, etc.

Of course, the wristband device 10 could take on many different configurations besides that illustrated in FIGS. 1-4. For example, as a reference, FIG. 5A illustrates a side view of the wristband 10 similar to that of FIGS. 1-4 in more detail. In this case, the band portion 12 is illustrated as including a flexible base or a substrate portion 16 that may be made of any suitable flexible material such as, for example, cloth, leather, plastic or other material, while the flexible electronic display 18 is disposed on the substrate 16. The clasps 14 may be the same size as each other and may be the same height as the flexible electronic display 18 and the substrate 16 together. In another case, the clasps 14 may be larger in height than the flexible electronic display 18 and the substrate 16 and, in this case, may stick out above surface of the flexible electronic display 18 and/or below the bottom surface of the substrate 16. As noted above, one or both of the clasps 14 may be or may include an electronics module 19 that holds electronics, such as processors, memories, sensors, batteries, etc. that are used to power and drive the flexible electronic display 18 and to provide other communication functionality for the wristband 10. If desired, the components of the electronics module 19 may be sealed or otherwise protected from water, air, dirt, etc. to which the exterior of the device 10 is exposed. For example, any or all of these electronic components may be encapsulated in one or both of the clasps 14 in a hermetically sealed manner to prevent any direct exposure of these components to exterior forces and environmental hazards.

Figure 5B:
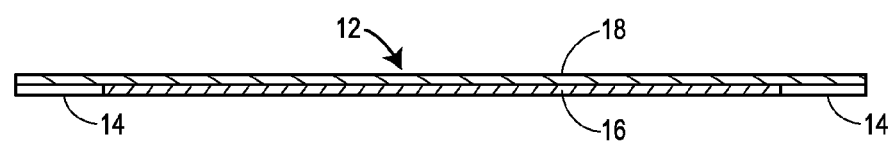
FIG. 5B is a side view of an example attachable article in the form of a wristband having a flexible electronic display disposed over an entire length of a substrate.

In another embodiment, as illustrated in FIG. 5B, an attachable article in the form of a wristband 10 has the flexible electronic display 18 disposed over the entire length of the substrate 16 and end portions 14, which may be part of the substrate 16. In this case, the flexible electronic display 18 spans the entire length of the band portion 12 and of the wristband device 10 and thus goes from end to end of the device 10. The connection structure, in the form of for example, magnets (not shown in FIG. 5B) may be disposed in the end pieces 14 and/or, if desired, in portions of the flexible substrate 16 or in an electronics module coupled to the flexible substrate 16.

Figure 5C:
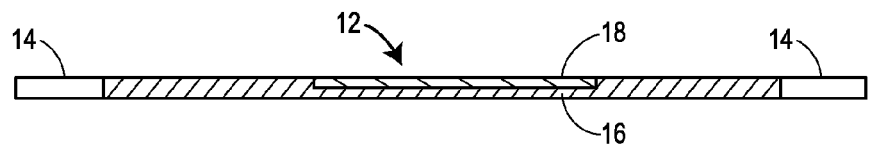
FIG. 5C is a side view of an example attachable article in the form of a wristband having a flexible electronic display disposed on a center portion of a flexible substrate.

In yet another configuration, as illustrated in FIG. 5C, an attachable article in the form of a wristband 10 has a flexible electronic display 18 disposed on a limited portion of the flexible substrate 16 so that the flexible electronic display 18 is only disposed, in this case, in the center portion of the band 12. Of course, while not shown, the flexible electronic display 18 could be disposed on any other portion of the band 12, including in portions offset from the center of the band 12 and the flexible electronic display 18 could cover any desired amount or portion of uppers surface of the band 12. Here again, any desired connection structure could be provided in the ends of the substrate 16, including in the clasps 14, to connect the two ends of the band 12 together.

Figure 5D:
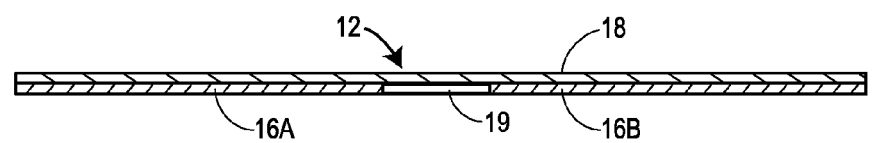
FIG. 5D is a side view of an example attachable article in the form of a wristband having a flexible electronic display disposed over a substrate having two flexible end pieces connected by an electronics module.

In a still further case, as illustrated in FIG. 5D, an attachable article in the form of a wristband device 10 has a flexible electronic display 18 disposed over a substrate 16 having two flexible end pieces 16A and 16B connected by an electronics module 19 which, in this case, is illustrated is being disposed in the center of the flexible substrate 16. The electronics module 19 may or may not be made of a flexible material and in either case may still be part of the flexible substrate 16 is desired. Moreover, while being illustrated in the center of the substrate 16, the electronics module 19 could be disposed at any other location along the substrate 16 including at any position offset from the center of the substrate 16. Again, any desired connection structure could be attached to or disposed in or on the end portions of the device 10, including the ends of the substrate 16.

Figure 6:
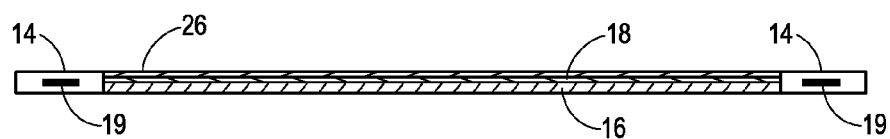
FIG. 6 is a side view of an example attachable article in the form of a wristband having a flexible touchscreen disposed on a flexible electronic display and a flexible substrate which are disposed between two clasps.

In another embodiment, as illustrated in FIG. 6, the wristband or attachable article 10 may be configured similarly to that of FIGS. 1-5D, but may also include a touchscreen interface 26 disposed over the flexible electronic display 18. In particular, in this case, the touchscreen interface 26 can be a capacitive touchscreen or any other type of touchscreen interface that is transparent in nature, and thus can be laid over top of the flexible electronic display 18 to allow the flexible electronic display 18 to be viewable there-through. As will be understood, the touchscreen interface 26 of FIG. 6 is powered by and controlled by the electronics disposed within one or more electronics modules 19 illustrated as being disposed, in this case, in both of the clasps 14 to perform various different types of touch detection functionality associated with a typical touchscreen display. Of course, the touchscreen interface 26 could be added to any of the wristband configurations of FIGS. 5A-5D or to any of the other attachable article embodiments described herein.

Figure 7A:
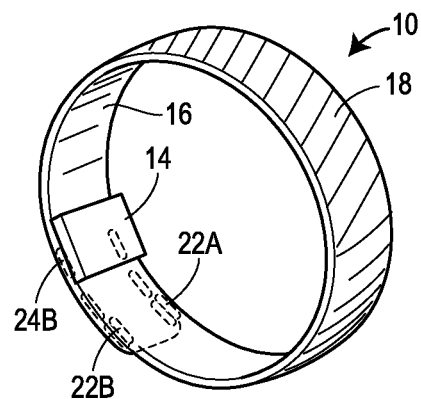
FIGS. 7A and 7B illustrate a perspective and top view, respectively, of an example attachable article in the form of a wristband having a clasp member at one end of the wristband and various magnetic members disposed on either end of the wristband to form an adjustable connection structure.
Figure 7B:
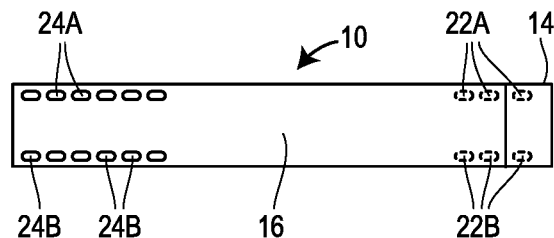

While the wristband device of FIGS. 1-6 is generally illustrated as having a flexible electronic display and a flexible substrate disposed between or including two magnetically coupled clasps 14, with at one of the clasps 14 possibly containing or operating as an electronics module 19, other manners of disposing connection structure on the wristband device 10 and of locating the electronics module 19 could be used instead. For example, FIGS. 7A and 7B illustrate an example attachable article in the form of a wristband device 10 having a single clasp member 14, such as one of clasps members 14 of FIGS. 1-6, disposed at one end of the flexible electronic display 18 and a set of magnets 22 and 24 or other magnetic material disposed on or in an end piece or end portion attached to or formed as part of the other end of the flexible substrate 16. In this case, individual magnets 22A and 22B are disposed in a spaced apart manner within the end piece 14 or are disposed in the flexible substrate 16 next to the end piece 14 and operate in conjunction with the individual magnetic materials 24 which are spaced apart and disposed on the other end piece of the band 12 to form a secure magnetic connection when the band portion 12 is wrapped around a user's wrist, for example. The spaced apart nature of the individual magnetic members 22 and 24 enable the band 12 to be adjustable in length so that a pair of magnetic members 22A and 22B (on opposite sides of one end of the band 12 or substrate 16) may meet up with any of a number of different pairs of magnets 24A and 24B (on opposite sides of the other end of the band 12 or substrate 16) to enable the length of the band, when connected, to be adjustable. Of course, the magnetic members 22 and 24 may each be permanent magnets, or one may be made of permanent magnets while the other is formed of magnetically permeable material. Of course, the spaced apart magnetic material configuration of FIGS. 7A and 7B may be used in any of the embodiments illustrated in FIGS. 1-6.

Figure 8:
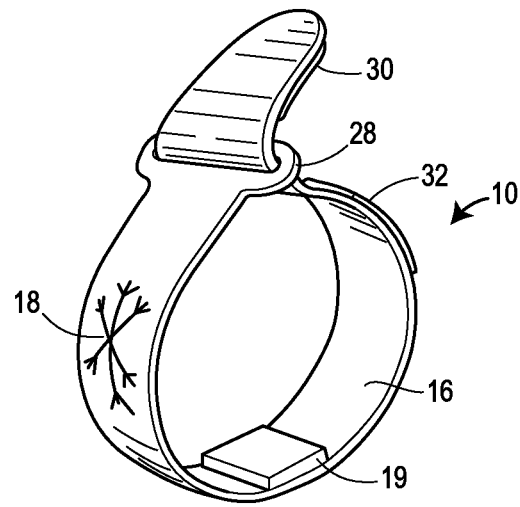
FIG. 8 illustrates an example attachable article in the form of a wristband having an electronics module disposed in the center of the article with a non-magnetic connection structure used at the ends of the flexible substrate to secure the article in a loop.

Moreover, while FIGS. 1-7 illustrate magnetic based connection structure, other adjustable connection structure, such as any desired hook and loop connection material, like Velcro, a buckle and hole structure, a snap fit buckle, etc. could be used instead of magnetically coupled connection structure. As a further example, FIG. 8 illustrates an example attachable article in the form of a wristband device 10 having an electronics module 12 disposed in the center of the band 12 with a non-magnetic clasp arrangement used at the ends of the flexible substrate 16 to secure the article 10 to a wrist of a user or other mounting member in an adjustable manner. In this case, a loop or buckle member 30 is attached to one end of the flexible substrate 16 and hook and loop pads 30 and 32 (one being hook material and the other being loop material) are attached to the end portions of the band 12. Here, one end of the band portions 12 may be looped through the buckle 28 and bent back to enable the hook and loop material pads 30 and 32 to contact each other and thus secure the band 12 to a user's wrist or other structure. Of course, while the electronics module 19 is illustrated as being located in the center of the band portion 12, the module 19 could be located on one of the ends as well, such as near the buckle 28, or at any other position along the band portion 12, such as a third of the length of the band portion 12 from one end of the band portion 12, a fourth of the length of the band portion 12 from one end of the band portion 12, etc. Moreover, use of the buckle 28 in FIG. 8 is not necessary, and instead hook and loop pads may be placed at opposite ends of the band 12 to enable an adjustable connection between the two ends of the band 12.

Figure 9A:
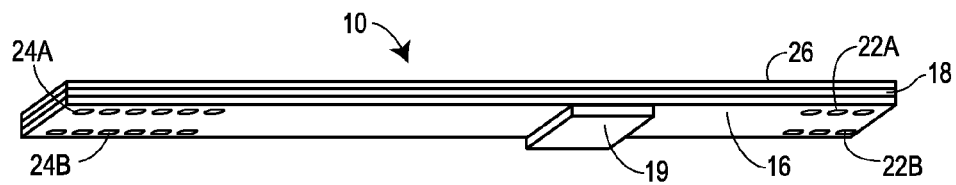
FIG. 9A illustrates an example attachable article in the form of a wristband having an adjustable clasping mechanism in the form of one or more magnets, an electronics module disposed at approximately one third of the length of the band from one end of the band, and a touchscreen input layer.
Figure 9B:
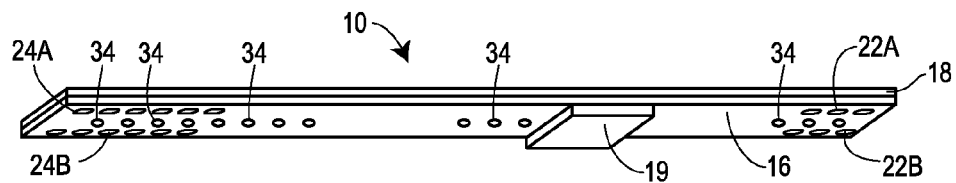
FIG. 9B illustrates an example attachable article in the form of a wristband having an adjustable clasping mechanism in the form of one or more magnets, an electronics module disposed at approximately one third of the length of the band from one end of the band, and a set of pressure sensors or magnetic sensors disposed in the band.
Figure 9C:
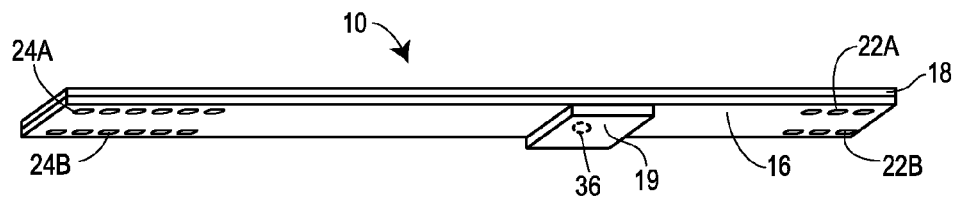
FIG. 9C illustrates an example attachable article in the form of a wristband having an adjustable clasping mechanism in the form of one or more magnets, and an electronics module, having a gyroscope component, disposed at approximately one third of the length of the band from one end of the band.

FIGS. 9A-9C illustrate various examples of an attachable article in the form of a wristband device 10 that includes and adjustable clamp or connection mechanism for enabling the ends of the band of the device 10 to overlap one another by different distances when worn so as to enable the wristband device 10 to be used on wrists of different sizes. In addition, however, each of the various devices in FIGS. 9A-9C include mechanisms for determining or enabling the electronics module 19 of the device 10 to determine the orientation of the band with respect to the user's wrist when being worn to enable better operation of the display features of the device 10. While a magnetic connection or clamping structure is illustrated in each of the devices 10 in FIGS. 9A-9C, other types of adjustable clamping or connection structure could be used instead and allow the electronics module 19 to be able to determine the orientation or positioning of the band or the display 18 when on the arm or wrist of a user. In addition, while the orientation detection and display calibration procedure described herein is described with respect to FIGS. 9A-9C when the devices of FIGS. 9A-9C are connected around the wrist of a user, the same or similar orientation detection and calibration procedure could be used when an attachable article is placed or connected around other body parts, including arms, legs, waists, or around other devices, like handlebars of bikes or motorcycles, etc. Likewise, the principles described herein for detecting the orientation and positioning of a band on a user's wrist with respect to FIGS. 9A-9C could be also be used with any other adjustable band mechanism, such as that illustrated in FIG. 8, as an example only.

More particularly, FIG. 9A illustrates an example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band 16 from one end of the band 16 and two-thirds of the length of the band 16 from the other end of the band 16. In addition, the device 10 of FIG. 9A includes a flexible touchscreen interface 26 disposed over the flexible electronic display 18.

FIG. 9B illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band support 16 from one end of the band 16 and two-thirds of the length of the band 16 from the other end of the band support 16. However, in this case, one or more pressure sensors 34 are disposed in or on the band support 16 and are electronically connected to the electronics module 19 to provide signals to the module 19 indicative of pressure, strain, or force applied to those locations of the band 16. While the pressure sensors 34 are indicated to be disposed at various points along the length on the band support 16 on both sides of the band support 16 near the ends of the support 16, these sensors may be disposed along the entire band support 16, only on one side of the support 16, or on any suitable portion of the support 16 for the purpose of detecting pressure or force applied to the band support 16 or display screen 18. Still further, the pressure sensors 34 may be any desired or suitable pressure sensors including piezoelectric sensors, strain gauges, etc. Additionally, any desired number of sensors 34 may be used and these sensors 34 may be spaced apart from one another any suitable distance along the length of the band support 16. Likewise, the sensors 34 may be disposed in the center of the band support 16 (from side to side) or offset from the center. Also, more than one sensor 34 may be located at any longitudinal location along the band support 16. Alternatively, the sensors 34 of FIG. 9B could be magnetic sensors which sense magnetic field strength, for example. In this case, the magnetic sensors 34 may detect whether one or more magnets on one end of the band (used a part of the coupling mechanism) are near to or are interacting with magnets or magnetic material on the other end of the band. Here, the magnetic sensors 34 may be used to detect the amount of overlap of the ends of the band.

FIG. 9C illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band support 16 from one end of the band 16 and two-thirds of the length of the band 16 from the other end of the band support 16. However, in this case, a gyroscopic detection element 36 is dispose in the electronic module 19 and operates to detect the orientation of the band (or at least the electronics module 19 or other location at which the gyroscopic element 36 is disposed). The gyroscopic element 36 operates to detect the orientation of the band with respect to gravity or other acceleration force to which the element 36 is subjected. While a single gyroscopic element 36 is illustrated as being disposed in the electronics module 19 of FIG. 9C, this or similar elements could be disposed at other locations along the band (e.g., within the support 16 of the band) and/or multiple gyroscopic elements 36 could be disposed at various locations along the support 16.

Generally speaking, the embodiments of FIGS. 9A-9C include structure or elements, such as a touchscreen interface 26, pressure or magnetic sensors 34 or gyroscopic elements 36 that can be used to assist the electronics module 19 in determining the orientation or positioning of the wristband support 16 or the display 18 with respect to one or more fixed locations on a user's wrist when the device 10 is wrapped around the user's wrist. This operation enables the module 19 to then calibrate the display 18 to place or center display information such as display screens at particular locations with respect to the user's wrist, such as being centered on the top of the wrist, on the bottom of the wrist, on the inner side of the wrist, on the outer side of the wrist, etc.

Figure 10A:
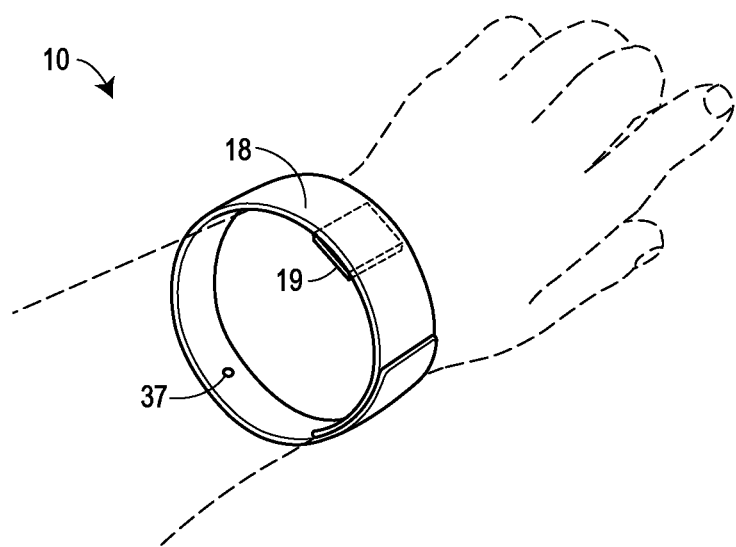
FIGS. 10A and 10B illustrate the manner in which an attachable article with an adjustable band causes the same portion of the band to be located or oriented near a different part of a user's wrist when the adjustable band is adjusted to fit different sized wrists.
Figure 10B:
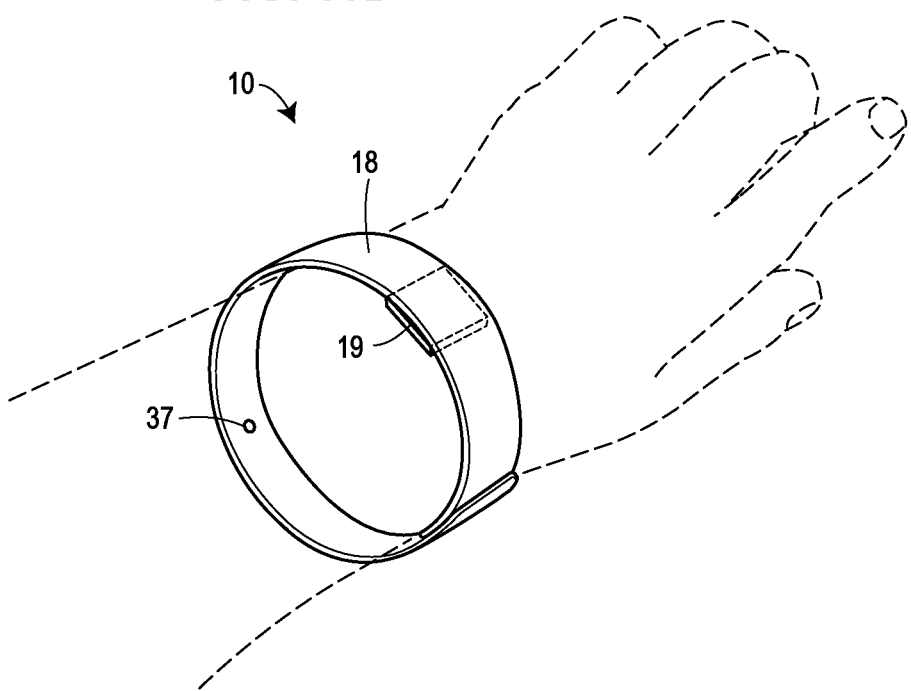

To illustrate the operation of this band orientation and calibration procedure, FIGS. 10A and 10B depict the same wristband device 10 (which may be any of those of FIGS. 9A-9C) disposed around different sized wrists, with the electronics module 19 disposed at the top of the user's' wrists in both cases. However, as illustrated in FIG. 10A, the point 37 is disposed on the direct underside or bottom of the wrist, while in FIG. 10B, this same point 37 is disposed between the bottom of the wrist and the outer side of the wrist, due to the difference in the positioning of the band on the different sized wrists. Thus, if the electronics module 19 were to try to place or center a particular display screen on the flexible electronic display at the bottom of the wrist in both cases, the electronics module 19 would need to address the flexible electronic display 18 differently due to the different adjustment of the band support 16 on the different wrists. Of course, this same phenomenon exists for placing a display screen at any location with respect to a user's wrist other than the top of the wrist, assuming that the user always places the electronics module 19 at the top of the wrist when wearing the band. In any event, to correct for this phenomenon, the electronics module 19 must detect the orientation of the band (e.g., the support 16 or the display 18), such as by detecting the part of the band that is disposed at a particular location with respect to the wrist, such as the bottom of the wrist, for each different user. Moreover, if a user does not always place a particular part of the band, such as the electronics module 19, at a particular location on the wrist, such as at the top of the wrist, when wearing the band, then the electronics module 19 must detect the orientation of the band with respect to two or more locations on the user's wrist such as at the top and the bottom of the wrist, and calibrate the display with respect to these two or more points, in order to be able to center or place different display screens at particular locations on the band with respect to the user's wrist.

Figure 11:
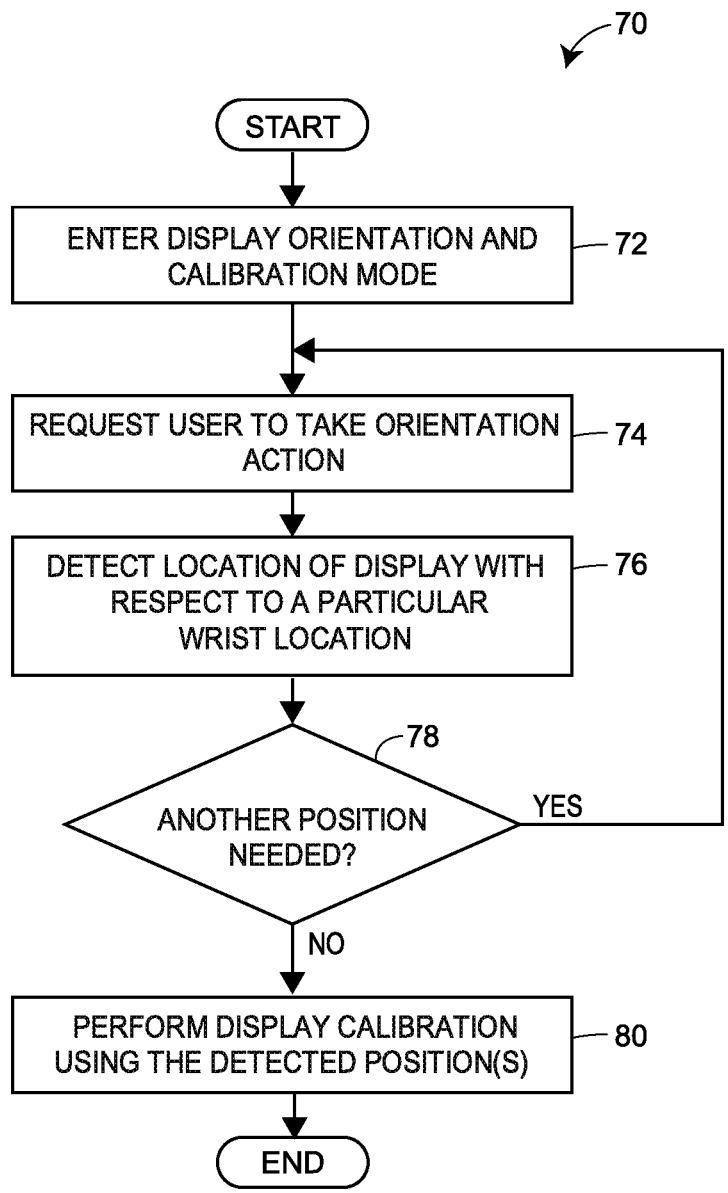
FIG. 11 depicts a flow chart of a band orientation detection and calibration routine that can be used with an adjustable band to selectively provide display screens at specific locations on the band with respect to a wearer's body.

FIG. 11 illustrates a flow chart 70 that may be implemented by a band orientation detection and calibration routine which may be stored in a memory of and executed on a processor of the electronics module 19 to perform band orientation and display calibration to enable the electronics module 19 to be able to place or center particular display screens at particular locations on a band with respect to a user's wrist, such as at the top of the wrist, the bottom of the wrist, the inner side of the wrist, the outer side of the wrist, etc. The routine is especially useful when the band is an adjustable band that can be adjusted to various different sizes to fit different user's wrists, for example. Moreover, this routine can be useful when the module 19 is programmed or configured to provide public screens, such as those that display the time, date, images, etc. in more publically visible locations on the band, such as on the top of the band and on the outer side of the band, when the band is on a user's wrist, and is programmed or configured to provide or display more private displays, such as e-mail displays, text message displays, incoming phone call user ID displays, etc., on the bottom of the wrist or on the inner side of the wrist. In particular, in all of these cases, the electronics module 19 needs to know the position of the band or the display 18 on the band that is directly adjacent to such wrist locations to be able to center the public or private display screens at any of these locations. While the method of the flow chart 70 is described with respect to being executed by the electronics module 19, in some embodiments, at least a portion of the band orientation detection and calibration routine may be stored in one or more memories of one or more other devices that are in communicative connection with the device or article 10, e.g., a master device, a server, a computing cloud, etc., and executed by one or more processors of the one or more other devices, such as discussed further below and with respect to FIG. 13.

At a block 72, the routine 70 receives or detects an input to enter a display orientation and calibration mode. The block 72 may execute in response to a user instructing the electronics module 19 to enter the orientation and calibration mode, such as with a user input of any type including via a touchscreen display, a remote signal, etc. In some cases, however, the block 72 may operate automatically when the band is first wrapped around a wrist so that portions of the ends of the band overlap. In this case, the electronics module 19 may detect the repositioning of the band using sensors (such as magnetic sensors) located in the band that detect magnet on one end or side of the band being in close proximity to other magnets on the opposite end or side of the band, using strain gauges that detect a particular curvature of the band over a particular length (such that the band is curved into a loop), etc.

Next, at a block 74, the routine 70 requests the user to take one or more preset or predetermined actions to enable the electronics module 19 to be able to detect the position of at least one portion of the band with respect to a known portion of a user's wrist. For example, the block 74 may ask the user to press the band or display 18 on the location of the display screen that is at the top of the wrist, the bottom of the wrist, one of the sides of the wrist, etc. In another example, the block 74 may ask the user to press at multiple locations simultaneously or in sequence, such as squeezing the band together at the top and the bottom of the wrist. In still another example, the block 74 may ask the user to place his or her wrist in a particular orientation, such as on a flat surface or level with the top of the wrist facing up and the bottom of the wrist facing down. In still another case, the routine 70 may merely ask the user or display a button to allow the user to start a band orientation determining procedure.

After waiting for the user to take the requested action or actions, a block 76 detects the location of the display oriented or disposed adjacent to a particular wrist location. In particular, the block 76 may use signals from the touchscreen display 26 of FIG. 9A, from one or more of the pressure sensors or magnetic 34 of FIG. 9B or from the gyroscopic element 36 of FIG. 9C to detect the position at which the user touched or pressed the band in response to the instructions of the block 74, or the position of the band at the bottom or top of the wrist when the wrist is in a particular known orientation, such as level. In some cases, the block 76 may determine the amount of overlap of the two ends of the band to determine a position on the band, when connected that is directly opposite the electronics module 19.

More particularly, in the embodiment of FIG. 9A, if the user touched the touchscreen 26 at the bottom of the wrist, or at both the top and bottom of the wrist simultaneously in response to the instructions of the block 74, then the block 76 determines, from the touchscreen interface 26 associated with the embodiment of FIG. 9A which point or points were touched. In a similar manner, in the embodiment of FIG. 9B, if the user touched the band at the bottom of the wrist, or at both the top and bottom of the wrist simultaneously in response to the instructions of the block 74, then the block 76 determines, using the signals from the pressure sensors 34, where the user pressed the band. To do so, the block 76 may simply detect the highest pressure reading from the group of pressure sensors 34 and use that as the detected touch location. In another case, the block 76 may interpolate between two or more pressure signal locations to detect the location between those signals that appears to have the highest pressure reading. In still another case, the block 76 may, in response to a user input to start a calibration procedure, use magnetic sensors 34 disposed in the band to determine the amount of overlap of the ends of the band, and may determine the underside or bottom of the user's wrist as the location directly opposite (e.g., the same distance) from the electronics module 19 in both directions along the band as coupled. Of course, other parts of the wrist could be determined in this similar manner. In these case, the user request to take an action from the block 74 may be simply providing the user with a calibration button that, when pressed or activated by the user, starts the calibration procedure that determines the amount of overlap of the ends of the band. In still another manner, in the embodiment of FIG. 9C, if the user placed his or her wrist in a predetermined orientation, than the block 76 may determine from the one or more gyroscopic elements 36 in the attachable article 10 which locations of the band are flat with respect to the force of gravity or otherwise detect the orientation of one or more portions of the band to determine which portions of the bank are at the top of the wrist, the bottom of the wrist, one of the sides of the wrist, etc. based on the gyroscopic element readings during a known orientation of the band. Of course, other methods of detecting user actions (such a touch events, shaking the arm in a specific manner, etc.) or detecting specific positions of the band with respect to a user's wrist could be used instead, and any suitable combination of the structure and routines described herein with respect to the bands of FIGS. 9A-9C could be used as well. In any or all of these scenarios, the blocks 74 and/or 76 may operate so that an orientation detection and calibration procedure will only be performed when the two ends of the band are detected as being overlapping or are disposed in an overlapping manner around an exterior object (such as by the use of one or more magnetic sensors).

After the block 76 determines the associated wrist position of one portion or location of the band, a block 78 may determine if another band position is needed. For example, the band orientation detection procedure 70 may require that the user identify two locations of the band with respect to an exterior object, such as first identifying the top of the wrist, and then the bottom of the wrist. In another case, the routine 70 may perform the position detection at the same wrist location more than once in order to assure a better determination, such as by determining an average of two or more position detections, for example. In the case in which a known portion of the band (such as the electronics module 19) is not always placed at a known location with respect to a user's wrist (such as at the top of the wrist or at the bottom of the wrist), then the band position orientation and calibration routine 70 may need to make two or more position detection measurements in order to be able to determine which portion or position of the band is at which position of the user's wrist. Moreover, detecting more positions on the band (e.g., the position of the band at the top of the wrist, at the bottom of the wrist, at the inner side of the wrist and at the outer side of the wrist) will generally provide for a better calibration of the display 18 with respect to the wrist. In any event, if another reading is needed, control is provided from the block 78 back to the block 74 which again asks the user to take some detection initiation action with respect to the band. Thereafter, the blocks 76 and 78 repeat operations until all of desired or needed the band locations have been determined.

After all of the band positions or locations have been determined, a block 80 performs display calibration using the detected position(s). In particular, the block 80 may set the specifically detected or determined parts of the display as reference points for display screens to be provided on the display device, such as the various display screens of FIGS. 14A-14E. If desired, the electronics module 19 may then center display screens at or based on these detected positions, and may scale the sizes of the display screens based on the distances between the detected positions or based on the distance between a detected position and a fixed position on the band, such as the center or the electronics module, one or both ends of the band, etc. Furthermore, after the display calibration has been performed, various public display screens or information may be reliably placed at or centered at more publically visible positions of the band, such as at the top of the wrist or on the outer side of the wrist, while various private display screens or information may be reliably provided at or centered at less publically visible positions of the band, such as on the bottom of the wrist or on the inner side of the wrist, even though the band is adjustable in length. While the calibration routine has been generally described as calibrating the flexible electronic display to center display screens at the detected points on the band, the calibration routine could be configure to offset the center of display screens at other points on the flexible electronic display in reference to the detected point(s) on the band and need not center screens at the detected points.

In other situations, indications of the locations and/or positions that were touched or otherwise indicated by the user are sent in a wired and/or wireless manner to one or more other devices, for example, to another computing device and/or to a cloud of computing devices. In an example, the one or more devices that receives the indication of the detected locations from the article 10 is a host device (e.g., a mobile phone, a laptop or other computing device, or a host cloud of computing devices) that has a wired and/or wireless data connection with the article 10, and with which the article 10 has at least a partial master/slave relationship. The detected locations and/or positions may be pre-processed on the article 10 (e.g., by an application 60 hosted at the article 10) and the article 10 may transmit a signal indicative of the detected locations and/or positions to the host device or the host cloud of computing devices. Additionally or alternatively, indications of the detected locations and/or positions may be directly being sent to the host device or to the host cloud of computing devices by the article 10 or by an application 60 running on the article 10 as the indications are received from the sensors 52. The host device/computing cloud may use the indications of the received detected locations and/or positions to instruct the article 10 to perform corresponding actions related to display calibration.

In another example, the device receiving the indication of the detected locations and/or positions or the corresponding signal is a peer device, and the peer device transmits a signal or response based on the received indication of the detected locations and/or positions to the article 10. The article 10 then causes corresponding display calibration actions to be performed based on the received transmission from the peer device. In a similar manner, the indication of the detected locations and/or positions or the corresponding signal may be received by a cloud of computing devices, e.g. a computing cloud, which may be a host computing cloud or a peer computing cloud. The cloud of computing devices processes the received indication of the detected locations and/or positions, and transmits a signal or response based on the received indication to the article 10. The article 10 then causes corresponding display calibration actions to be performed based on the received transmission from the computing cloud.

Moreover, while the display orientation and calibration routine 70 has been described herein with respect to performing display location detection and calibration when the display is placed on a user's wrist, the same or similar routine could be used to perform display orientation detection and calibration when a band is looped around other body parts, such as legs, waists, arms, etc., as well as when the band is looped around other devices not being body parts. In an embodiment, each calibrated orientation for different locations on a person's body or in his or her environment to which the band or device 10 may be attached (e.g. arm, wrist, leg, pole, backpack strap, etc.) may be saved at the device 10 (and/or at a remote location communicatively connected to the device 10) so that the device 10 may be quickly and easily re-calibrated when attached in known positions and/or around known objects. Additionally or alternatively, each calibrated orientation for each different user of the device 10 may be saved at the device 10 and/or remotely so that the device 10 may be quickly and easily re-calibrated for future uses by different users.

Figure 12:
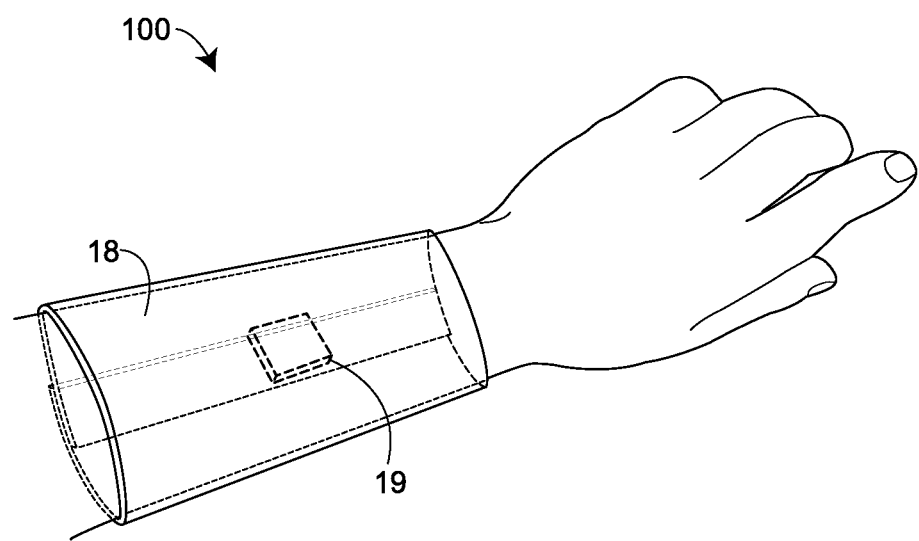
FIG. 12 depicts an arm band constructed according to the principles described herein.

Still further, while the functioning of a band and the routines performed on the band have been described with respect to a wrist band that is longer than it is wide, when laid flat, the same structure and techniques can be used for other types of bands, such as arm bands. FIG. 12, for example, illustrates an arm band 100 in which the display 18 wraps around a larger part of a user's arm, as opposed to just the wrist. In this case, the band 100 may be wider than it is long when laid flat. However, in this case, the display 18 and the electronics module 19 may be configured in any of the manners described above. For example, the same or a similar display orientation and calibration procedure as that described in conjunction with FIG. 11 may be used in the armband of FIG. 12, but this procedure may also include detecting longitudinal points along the length of the arm as well as (or instead of) points around the arm.

Figure 13:
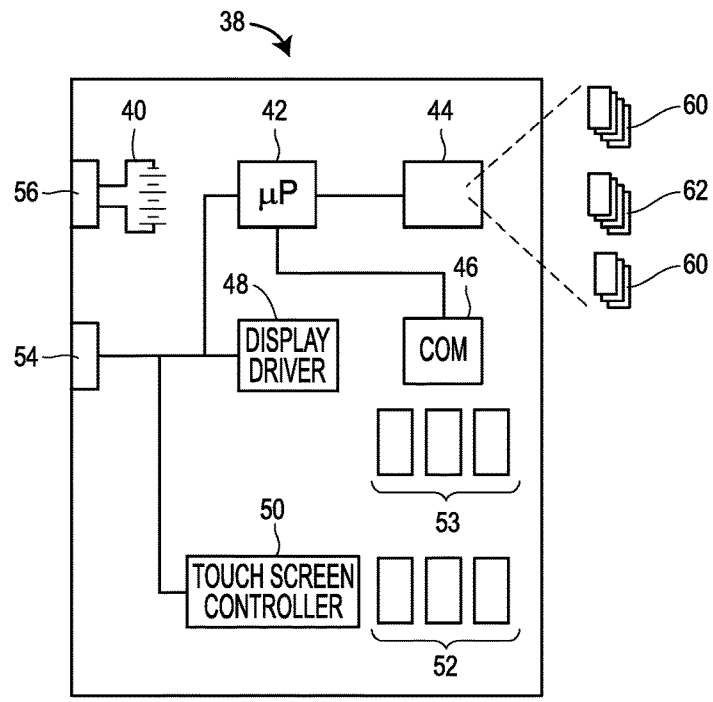
FIG. 13 is a block diagram of an electronics module associated with the attachable articles of FIGS. 1-12.

FIG. 13 illustrates a block diagram of various electronic components, referred to herein as an electronics suite 38 that may be used or disposed in the electronics module 19 to drive the flexible electronic display 18. In particular, the electronics suite 38 illustrated in FIG. 10 includes a battery 40 that powers a number of other modules or electronic components including a microprocessor or other processor 42, a computer readable memory 44, which may be, for example, a flash memory, a communication module 46, a display driver 48, a touchscreen controller 50 and a number of sensors 52 and other secondary devices 53. The sensors 52 may include, for example, an impact sensor or step counter, one or more gyroscopic sensors or gyroscopes, temperature sensors, vibration sensors, pulse rate monitors, pressure sensors, strain gauges, etc. For example, the sensors 52 may include any number of any number of types of the sensors such as strain gauges, gyroscopes, accelerometers, compression sensors, tensional strain sensors, positional sensors, motion or movement sensors, pressure sensors, vibration sensors, temperature sensors, orientation sensors, gravity sensors, light sensors, and/or piezoelectric sensors, to name a few. The secondary electronic devices 53 may include, for example, an alarm or noise creation device, a speaker, a microphone, a vibrator the operation of which causes the clasp 14 or electronics module 19 to vibrate, etc. Although FIG. 13 illustrates the sensors 52 and the secondary electronic devices 53 as being integral with the electronics suite 38, in some cases, one or more of the sensors 52 and/or the secondary electronic devices 53 are physically disposed at one or more other locations along the band 12 separate from the remainder of the electronics suite 38. In these cases, though, the separately disposed sensors 52 and/or secondary electronic devices 53 remain in communicative connection with the remainder of the electronics suite 38 (e.g., via a wired or wireless connection).

Similarly, although FIG. 13 illustrates the display driver 48 as being integral with the electronics suite 38, in some cases, the display driver 48 is physically disposed at another location separate from the remainder of the electronics suite 38. In an example, the display driver 48 is disposed in a location that is proximate to the electrodes or connectors of the pixel elements of the flexible electronic display 18, e.g., on the backplane of the flexible display 18 or at some other suitable location. The separately located display driver 48, though, remains in communicative connection with the remainder of the electronics suite 38 (e.g., via a wired or wireless connection) despite of the remote locations.

As will be understood, the memory 44, the communication module 46, the display driver 48 and the touchscreen controller 50, as well as the sensors 52 and other secondary electronic devices 53, are communicatively connected to the processor 42 and may operate to perform various functions in conjunction with applications or other programs implemented by the processor 42. Still further, each of these elements is connected to and is powered by the battery 40 in any known or desired manner. Still further, the electronics suite 38 of FIG. 13 may include one or more communication ports, such as communication port 54 (e.g., a USB or other type of digital communication port) and a power or battery charger input port 56. In this case, the power input port 56 may be connected to the battery 40 and enable charging or recharging of the battery 40 using any known or desired recharging circuitry and methodology. Alternatively or in addition, the communications input port 54 (in the form of for example, a USB input port) may be connected to the battery 40 and provide power to the battery 40 for charging battery 40, and the input port 54 may also be connected to the microprocessor 42, as well as to the communication circuit module 46, for performing wired-based communications via the input port 54. Of course, the communication input port 54, while being illustrated as a USB-type connection, could any other type of known wired or physical communication connection, including any desired serial or parallel digital communication port using any number of pins or wires, as is known in the art, an analog communication port, etc. Additionally or alternatively, the input port 54 may include a wireless input port for performing wireless communications.

In an embodiment, the power input port 56 may be a wireless input port, and in this case may, for example, be part of a battery charger unit that operates to charge the battery 40 using, for example, an inductively coupled charging technique. If the battery charger unit is part of an inductively coupled charging system, it generally responds to electromagnetic waves produced by an exterior charging unit (not shown) to charge the battery 40 when the attachable article 10 is disposed near the external charging unit. In another case, the battery charger of the input port 56 may be a kinetic energy charger unit that converts motion of the device 10 (such as that associated with movement of an arm when the attachable electronic device 10 is in the form of a wristband) into electrical energy which is provided to charge the battery 40. Moreover, if pressure sensors, strain gauges, gyroscopic detection elements and other sensors are provided in the band device, then corresponding detection circuitry will be provided in the electronics suite 38 to detect and process these signals.

As will be understood, the processor 42, which may be a programmable, general-purpose processor or a specially programmed processor programmed using any desired type of hardware or firmware programming, generally coordinates and implements the operation of the display 18 and the associated electronic components as described in more detail herein. The computer readable memory 44 stores various applications, including for example the general operating system implemented by the processor 42, and various applications (illustrated as a set of applications 60 in FIG. 10) to be run by the processor 42 to implement various different types of functionality via the wristband device 10 described herein. The memory 44 may also store one or more data files 62, which may be, for example, image or video data files associated with various images to be displayed on the display screen 18 at various different times. Still further, the memory 44 may store application data that may be created by the various applications 60 or the microprocessor 42 as part of the operation of various applications 60 and to be used by those applications 60 either during runtime of the applications 60 or at other times. If desired, the microprocessor 42 or one of the secondary electronic components 53 may include or be a clock that tracks the current time, day, date, month, year, time zone, etc.

As an example, one or more of the applications 60 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 60 may operate on the processor 42 to turn the display 18 associated with the wristband device 10 into a slave display device that may be tied to or communicably coupled to an exterior master device that is generating content to be displayed via the flexible electronic display 18. The master device, which may be a smart phone or a nearby computer device, may be wirelessly connected to the electronics suite 38 to provide content to be displayed on the flexible electronic display 18 and will typically have more memory, and computing and processing power than the processor 42.

The communication module 46 of FIG. 13 may include or use any type of communication hardware/software/firmware that uses any desired types of communication techniques to enable the microprocessor 42 to communicate with exterior devices or sources. Of course, the communication module 46 could include multiple different types of communication hardware/software/firmware, including any kind of hardwire-based communication module or wireless-based communication module. As examples, the communication module 46 may be a wired or wireless Internet-based communication module that may provide wired or wireless-based, IP protocol communications between the article or device 10 and other devices or a communication network such as a peer computing device or devices, a master computing device or devices, a server, a computing cloud, and/or one or more other networks such as a LAN or a WAN to which other devices are communicatively connected. Likewise, the communication module 46 may include a near field communications (NFC) module, a radio frequency identification (RFID) communications module for communicating with, sending messages to and/or receiving messages from RFID tags stored in other devices around or close to the wristband device 10. In this case, the communications module 46 may decode signals received from RFID tags in response to pings by the RFID communication module 46 to identify the RFID tags or tag numbers (identifiers) associated with these devices. Likewise, the communication module 46 may be a near field communication (NFC) module or a Bluetooth communication module, which may perform near field communications or Bluetooth communications in any known or desired manner with nearby NFC or Bluetooth enabled devices, thereby enabling wireless communication between the wristband device 10 and other closely situated or closely located electronic devices. Still further, the communications module 46 may include a USB or other type of wired communication module for decoding and encoding USB-based communication signals to be sent out and received via the USB communication port 54.

As illustrated in FIG. 13, the display driver 48 is coupled to the microprocessor 42 and to the display 18, and drives the display 18 to present different images to a user and thus implement functionality via the display 18. The display driver 48 may be associated with or use any type of display driver technology associated with the various different types of flexible electronic displays that might be used, including, for example, e-ink or other bi-stable display drivers, organic light emitting diode (OLED) display drivers, etc. Of course, it will be understood that the display driver 48 is connected to the various pixel elements of the flexible electronic display 18 to illuminate or cause the pixel elements to obtain or reach a color, a lighting level, an on-off state, etc., so as to drive the display 18 to present various images and other functionality as determined by the particular application 60 being executed on the microprocessor 42. In some cases, the display driver 48 may present various images, such as one or more artistic renditions, patterns, etc. or other types of images stored in the memory 44 as one of the images 62 to be displayed on the flexible electronic display 18. Such an image may be any type of graphic element in the form of artwork, an indication of an association of the user with a particular university or other organization, such as a logo, a mascot, an icon, etc. In the case of a static display, and particularly when the flexible electronic display 18 is a bi-stable type of flexible electronic display, such as an e-ink type of display, the display 18 might display a particular image or background image whenever the device 10 is in a sleep mode, and thus in which the display driver 48 is not operating to actively drive the display 18.

Of course, the touchscreen controller 50 is connected to a touchscreen interface 26, such as that illustrated in FIG. 6, if such an interface exists, and receives input signals from the touchscreen interface 26. The controller 50 operates to decode these input signals to identify touch events that occur with respect to the touchscreen interface 26. The touchscreen interface 26 may be a capacitive touchscreen interface or any other suitable type of touchscreen interface disposed over the flexible electronic display 18, and may be transparent in nature to thus enable the pixel elements of the display 18 to be viewable through the touchscreen interface 26. Of course, other types of touchscreen interfaces may be used instead or as well. In any event, the touchscreen controller 50 operates to energize and control the touchscreen interface 26, as well as to recognize and decode touchscreen events to identify, for example, the location of each touchscreen event, a type of a touchscreen event, such as a tap or a swipe movement, etc. If desired, the touchscreen controller 50 alone or in conjunction with the processor 42 may operate to determine or recognize gestures that are input via the touchscreen interface 26, such gestures being, for example, a slide, a swipe, a multi-finger pinch or any other type of gesture that includes one or more finger movements coordinated with one another. Each such gesture may indicate an action to be taken on or via the device 10. Of course, the wristband device 10 may include other or different types of user input devices, such as interfaces that include buttons switches, roller balls, slide bars, etc., disposed on, for example, one of the clasps 14 of FIGS. 1-6. Such user interfaces may enable the user to perform more rudimentary functions, such as scrolling movements, on-off powering movements, mode switching, etc. that are traditionally entered via buttons or switches which can be actuated.

The sensors 52 may include any of various different types of sensors, such as one or more gyroscopes and/or accelerometers which detect (change of) movement of or the (change of) orientation of the band 12, rapid shaking of the band 12, etc. One or more of these types of movements may be considered to be a particular type of input, such as a gesture to reset the device 10, to change a mode of the device 10, etc. Likewise, the output of such gyroscopes and/or accelerometers can be used by the microprocessor 42 to determine the orientation or direction of the flexible electronic display 18 to enable the microprocessor 42, or an application 60 executed on the microprocessor 42, to determine the proper orientation of the image to be displayed on the flexible electronic display 18. In some instances, such motion detection and position detection devices might be located in two or more of the end pieces or clasps 14 or other electronics modules 19, to enable the device 10 to more accurately determine whether the wristband 10 is oriented around a wrist or other circular member or whether it is instead laid out flat or oriented in some other manner. The microprocessor 42 or an application executed thereon may change functionality based on the detected orientation of the wristband 10.

In some cases, the sensors 52 include one or more pressure or force sensors and/or strain gauges which detect pressure, strain, or similar forces that are considered to be an input to cause the functionality, behavior, and/or actions of the device 10 to change, e.g., provide a user indication of a calibration point or location, reset the device 10, change a mode of the device 10, change a presentation displayed on the flexible display 18 of the device 10, etc. In one example, two pressure sensors are positioned on or attached to the band 12 (e.g., as part of the backplane of the flexible 18 or as part of the support 16 so that when the dynamically flexible device 10 is attached to itself in a generally circular or looped configuration, the pressure sensors are diametrically opposed to each other.

Likewise, the sensors 52 may include step-counter or an impact-sensor like and accelerometer, which might be used to count the number of steps a user takes over a particular period time. Alternatively or in addition, the sensors 52 may include one or more temperature sensors, which may detect the ambient temperature, the temperature of the skin of the user when the device 10 is being worn, etc. The sensors 52 could also include a blood-pressure sensor device, which might check blood pressure or heart rate using known exterior blood-pressure sensor device technology.

As will be understood, the various different electronic devices or components disposed in or shown in the electronic suite 38 of FIG. 13 may be used in conjunction with one another in various different manners to provide a whole host of functionality for the attachable article 10, which might be beneficial in various different uses of that article. However, only some of these uses will be described in detail herein.

In a general sense, the flexible display 18 of any or all of the embodiments described herein may be manufactured as any type of flexible display, such as an e-paper display, an organic light emitting diode (OLED) display, etc. and this flexible display, once manufactured, may then be formed, curved or bent in various manners. Generally speaking, flexible display 18 may be made of two flexible substrates including a backplane flexible substrate and frontplane flexible substrate that are placed back to back, next to one another, laminated onto each other, or prepared so that the frontplane is directly disposed on the backplane. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the electronic display 18.

More particularly, the flexible electronic displays illustrated herein, may be manufactured as a flexible display, such as an e-paper display, an organic light emitting diode (OLED) display, etc. Generally speaking, the flexible electronic displays may be constructed on two flexible substrates, or may be constructed on one flexible substrate but having at least two flexible substrates. The flexible substrates may include a backplane display area and frontplane display area placed back to back or next to one another. The frontplane display area comprises an array of optic elements (e.g., electro-optic elements) provided on a first flexible substrate that are capable of displaying an image, while the backplane display area comprises an array of semiconductor devices or elements (e.g., transistor elements) provided on a second flexible substrate for driving or providing energization to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a transparent, flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. Nos. 6,585,914; 6,608,323; 6,991, 749; 7,374,702; 7,528,176; 7,569,693; 7,605,225; 7,671, 202; 7,816,480; 7,842,198; 7,892,454; 7,893,265; 7,902, 363; 7,947,837; 7,982,039; 8,022,214; 8,329,855; 8,404, 844; 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, and benzocyclobutene-based polymers. Other polymeric dielectrics are described in U.S. Pat. Nos. 7,605,394; 7,981, 989; 8,093,588; 8,274,075; 8,338,555; U.S. Patent Publication No. 2011/0175089; U.S. Patent Publication No. 2011/ 0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$ as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. Nos. 8,017, 458; 8,097,877; 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers. Generally, at least one of the two electrode layers is transparent, often composed of a transparent conductive oxide such as indium tin oxide (ITO). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. Electronic charges are applied to the capsules to bring particles of a selected color to the surface. Electrophoretic media and related display device structures are described in, for example, U.S. Pat. Nos. 5,930,026; 6,831, 769; 6,839,158; and 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. Nos. 7,446,945 and 8,111,465, the disclosure of each of which is incorporated by reference herein in its entirety for all purposes.

To integrate the TFT array backplane with the frontplane for a completed display system, the bottom or pixel electrode of the frontplane is connected to the drain or source electrode of the switching TFT in an e-paper display, and the driving TFT in an active matrix OLED (AMOLED) display.

Various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Moreover, it may be desirable to manufacture the flexible display 18 in a manner that maximizes the amount of the display area space viewable on the top layer of the device 10, i.e., that is viewable on the band 12. Generally speaking, the backplane of a flexible display 18 comprises a flat surface, or a first display substrate, and has a display area with various electrical energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component. Both the backplane substrate of the backplane component and the frontplane substrate of the frontplane component are flexible, and the backplane substrate and the frontplane substrate are positioned to thereby align or connect various energizing components and energizable components to form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink microcapsules or other electro-optical components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 18 may be built in layers, e.g., starting with the backplane and ending with attaching the frontplane substrate. In some embodiments, as in the case of e-paper or e-ink, the backplane and frontplane are first prepared separately and then are aligned to provide register coupling between the energizing components and the energizable components. In some embodiments, such as in the case of OLED, LCD, or electrowetting, the backplane and the frontplane are prepared so that the electro-optical material (e.g., the frontplane) is disposed directly on top of the backplane.

As will be understood, the wristband device 10 as described above can be configured and operated in many different manners to perform many different functions at the same or at different times. For example, the wristband device 10 may operate to execute any number of different types of applications including, for example, calendar applications, e-mail applications, web-browsing applications, picture, image or video display applications, stop-watch or other timing applications, alarm clock or alarming applications, location based applications including for example mapping applications, navigational applications, etc. In some cases, various different applications or functionality may be performed simultaneously, and different sections or portions of the flexible electronic display 18 may be used to display information associated with the different applications. For example, one portion of the flexible electronic display 18 may be used to illustrate calendar information provided by a calendar application, another portion of the flexible electronic display 18 may be used to illustrate e-mails associated with an e-mail application and a still further portion of the flexible electronic display 18 may be used to display a clock or stop watch associated with a timing application. Still further, the applications 60 executed on the device 10 may be executed on and display information computed solely with the electronics suite 38 of the device 10. In another case, one or more applications 60 may be executed by the processor 42 of the device 10 to interface with and display information received from external computing devices, such as a mobile phone, a laptop computer, a desktop computer, etc. In this case, the device 10 may act as a slave display device or may operate in conjunction with information received from the external computing device to provide information, graphics, etc. to a user on the flexible electronic display 18 of the wristband 10. The wristband 10 may communicate with external devices or an external network via any desired communication hardware, software and communications protocol, including any LAN or WAN based protocol, an NFC protocol, a Bluetooth protocol, an IP protocol, an RFID protocol, etc.

FIGS. 14A-14E illustrate various different types of displays or images which may be provided on the flexible electronic display 18 of the wristband device 10 at various different times or even at the same time. For example, in one scenario illustrated in FIG. 14A, the display 18 may depict a pattern, an artistic rendition or other image that is particularly expressive of the wearer or user, including for example, an image provided by the user, a picture or a photo, an image of a hand-drawn sketch, a team, corporate or other organizational logo, a message of some sort, or some other image that expresses some interest or personality trait of the user. Such an image might be displayed whenever the wristband device 10 is in a sleep mode, that is, when the wristband device 10 is not being actively used in other modes. Moreover, such an image could be resident on the display 18 for long periods of time whenever the display 18 is not in use, if the flexible electronic display 18 is a bi-stable display, such as an e-ink display, which requires no power to hold the image in place once image is been formed.

Figure 14A:
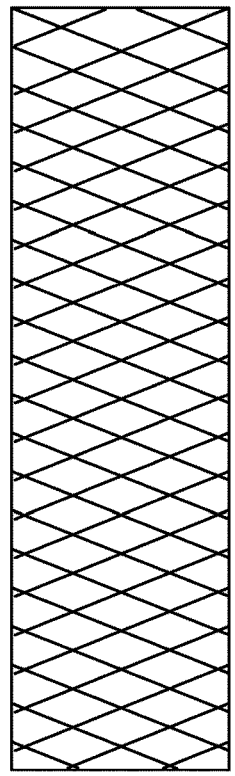
FIGS. 14A-14E illustrate various example display images that can be provided on the wristband device in different operational modes of the wristband device and illustrating different combinations of display screens providing different information at different locations on the band of the wristband device.
Figure 14B:
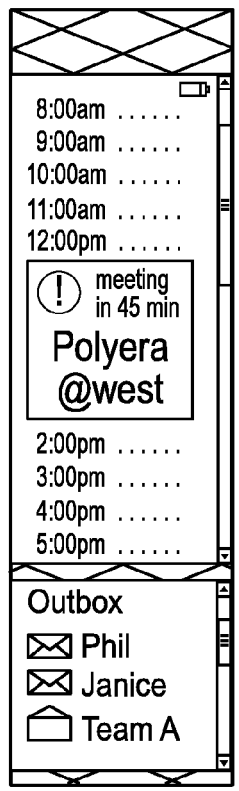

As illustrated in FIG. 14B, in another mode referred to herein as an office mode or a calendar mode, the wristband device 10 displays a calendar screen and an e-mail screen or other images associated with or set up to provide office or business related functionality. Such a mode may provide multiple images that enable the user to easily view e-mails, calendars and to use other business related applications. Thus, for example, the display 14B may provide a calendar of events, and may also display one or more e-mail icons, text messaging icons, etc., indicating e-mails or text messages that may be available and viewable to the user.

Figure 14C:
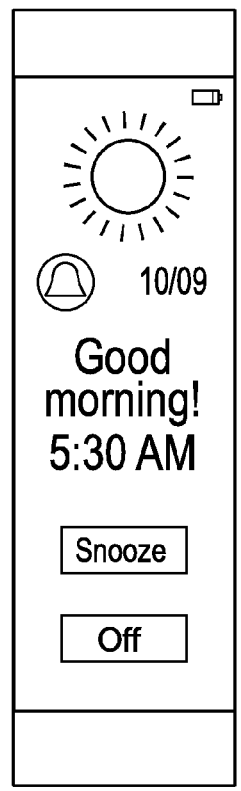
Figure 14D:

FIG. 14C illustrates the wristband device 10 in an alarm/clock mode in which the flexible electronic display 18 provides an alarm or clock display that may be generated by an alarm or clock application. An alarm may ring by sounding a speaker (e.g., one of the electronic devices 53 of FIG. 10) at a particular time according to a preset alarm notification, by flashing or otherwise visually displaying an alarm screen (as shown in FIG. 14C), and/or by using a gyroscope or accelerometer to vibrate the device 10 to cause a vibration indicating an alarm. Still further, as illustrated FIG. 14D, the wristband device 10 may be placed in an exercise or training mode in which the flexible electronic display 18 displays a stopwatch, a distance traveled or other indications of various athletic parameters that have been met or associated with an exercise routine including, for example, use of the step counter to determine the number of steps that have been taken, to determine the number of lifts that have been performed when, for example, lifting weights, etc. Likewise, in such a mode, the display 18 may display a distance traveled by a runner or walker, the time since the beginning of a run or other exercise, etc. Still further, as illustrated in FIG. 14D, a portion of the display 18 may be used to indicate one or more music files that a user has indicated as desired training music via a music application implemented on the article 10. Additionally, the display 18 may include a section showing a current heart rate of the user, e.g., as detected by a heart rate monitor included on the device 10. Note that in FIG. 14D, the heart rate monitor of the display 18 is oriented so that when the device 10 is attached around the wrist of the user, the heart rate display is oriented on the inside of the user's wrist in a direction that enables the user to quickly view the information displayed thereon.

Figure 14E:
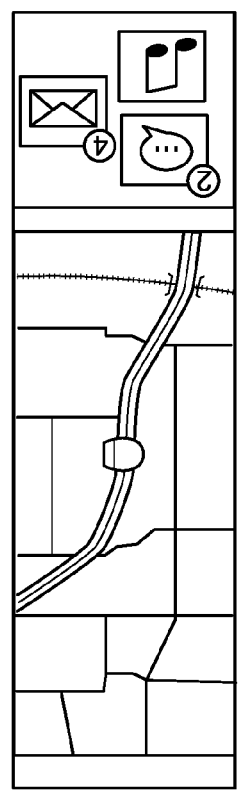

In a still further mode, illustrated in FIGg. 14E, the wristband device might be a slave display to another computer device, such as a navigation device within a car, a phone, a laptop computer, an e-reader. In this case, the display 18 may display, for example, a map, a route, directions, etc. on a map as provided by a navigation device to the wristband device 10 via, for example, a Bluetooth communication module or other communication module that provides communication between the wristband device 10 and the navigation device (not shown). Such a slave display might enable the wristband device 10 to be more visible to the user in a driving situation. For example, the wristband device 10 may be attached around a person's wrist or around a stand or other support within a vehicle so that the display 18 is visible to the driver or to a passenger. Of course, other types of visuals and displays can be provided with other types of applications stored on the wristband device 10 or in other communicatively coupled computer devices, such as phones or computers that communicate with the wristband device 10 to provide images or information for display to the user. For example, FIG. 14E includes an additional portion of the display 18 presenting thereon a slave display of other selected applications such as an email mailbox, a text messaging application, and a music application as hosted on another device (e.g., on a smartphone or other portable wireless device). In FIG. 14E, the additional portion is oriented so that when the device 10 is attached around the wrist of the user or around differently-sized in-vehicle support structures, the slave display of the application icons are oriented in a direction suitable for viewing.

Figure 15:
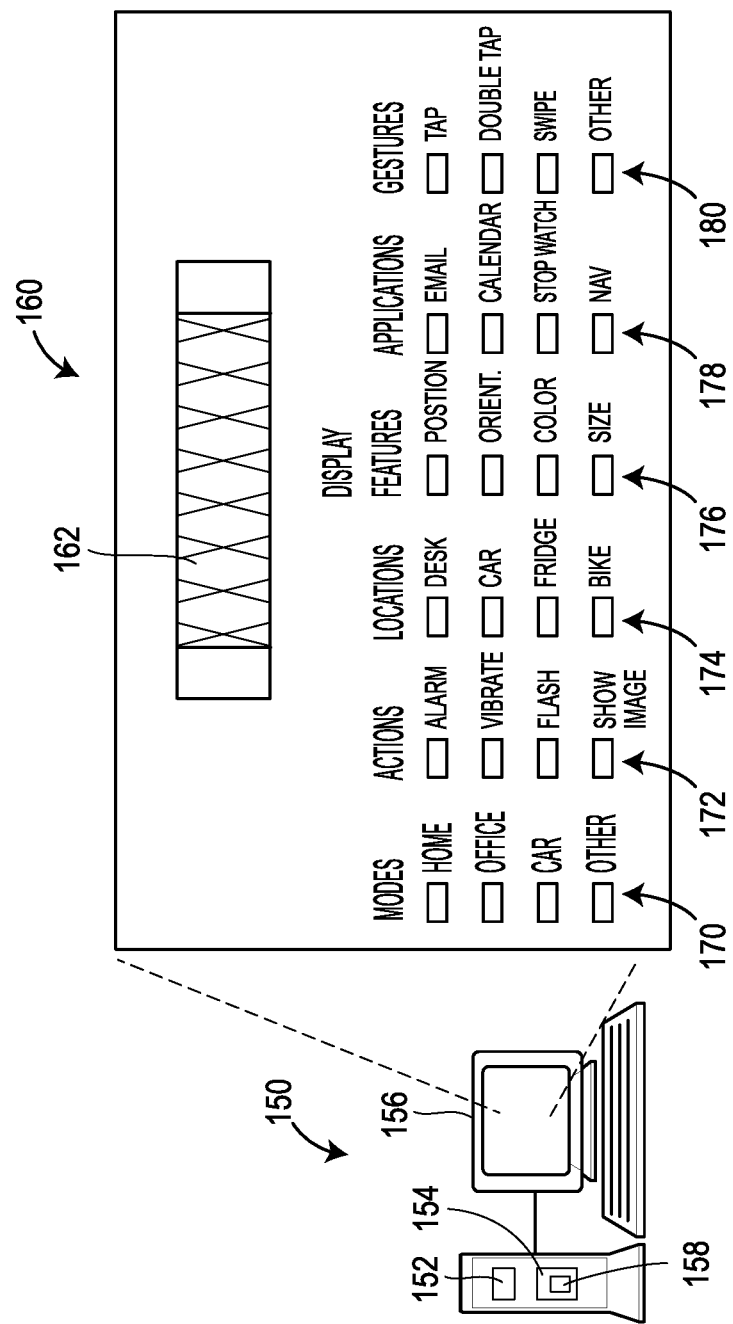
FIG. 15 illustrates an example computer system with a configuration screen that may be used to implement or specify the configuration of a wristband device having a flexible electronic display.

The user may be able to program or configure the device 10 to operate in any desired manner, including any desired default manner, based on the detected location, position, orientation, or movement of the device 10. In this case, a configuration application may be executed in a processor of a computer device to develop or configure the operation of the wristband device 10, including the various operational modes of the device 10, the various default settings based on the mode of the device 10, the motions or actions or locations that may trigger particular modes of the device 10, inputs or gestures associated with each mode or application of the device 10 and what those inputs or gestures may mean in the context of the device 10, etc. As an example, FIG. 15 illustrates a computer 150 having a processor 152, a memory 154 and a display 156. The memory 154 stores a configuration application 158 that may execute on the processor 152 to enable a user to configure the operation of the wristband device 10. In particular, the configuration application 158, when executed, may produce a configuration screen such as the configuration screen 160 illustrated in FIG. 15. The configuration screen 160 may display an image of the wristband device 162 to illustrate what will be displayed on the display 18 of the wristband device 10 at various times, and the manner in which this information will be displayed, such as the orientation, position on the display 18, etc.

In addition, as illustrated in FIG. 15, the configuration screen 160 may present a number of boxes or drop down menus, etc. which can be used to define various modes or other operational settings of the device 10 and the default operation of the device 10 during each such mode. For example, a user may select one of a set of mode boxes 170 to define the configuration of a particular mode of the device 10. The user may select a sleep mode box, an office mode box, an exercise mode box, a home mode box, a car mode, or may select an "other" box to define a new mode for which the device 10 is to be configured. Upon selecting the appropriate mode box 170, the user may be presented with information or options about the default and other operations of the device 10 during the selected mode. For example, the user may be able to define the actions 172, locations 174, e.g., as defined by the exterior strips 100 (e.g., of FIGS. 20-21) that might be used to enter a particular mode. Thereafter, another set of menus or drop down boxes or windows may be used to enable a user to define the placement, content, orientation, etc. or other display features 176 of information to be displayed on the flexible electronic display 18. Still further, the user may select one or more applications 178 to execute during a particular mode, the placement, size and area of the screen associated with the application display, the orientation of the display on the screen, the background features, borders features or other screen indicia, etc. Likewise, the user may define one or more RFID tag ids or other ids to define exterior locations that are to be associated with or that cause the wristband device 10 to enter or operate in a particular mode. In this manner, the configuration application 158 enables the wristband 10 to have default functionality based on the functions to be provided, based on the location of the device 10, based on its orientation or position around the wrist or not being connected around the wrist, based on movement of the device 10, etc.

In another case, the configuration screen 160 may enable the user to define one or more gestures 180 associated with a particular mode or a particular application on the device 10. Thus, for example, the user might define a gesture that, when detected on the touchscreen interface 26 of the device 10, such as a swipe gesture, a pinch gesture, a double tap gesture, etc. causes the device 10 to operate in a certain manner, such as to switch between modes, to change orientation of the image on the display 18, to cause portions of the displayed information to move or to appear or disappear, or to cause a particular action within an application, such as to pull up new information, etc. Thus, using the configuration application screen 160, the user may define various different gestures or may preprogram various gestures to define desired device functionality, such as switching between modes, turning on and off the device or applications, switching applications, moving images or content of particular applications on the display 18, taking actions within an application, etc. As a further example, one gesture may be defined by the user to unlock the device 10 or allow operation of the device 10 such as implementing a locking or security feature. In this case, is not necessary that the device 10 display numbers or have the user pick a set of numbers indicating a pass code but, instead, gestures might enable the user to define an action that will unlock device, such as a swipe in one direction, two taps and a swipe in a particular direction, etc. Of course, the same gesture could be used for different types of operations in different modes of the device 10 or with different applications implemented by the device 10, and any combination of gestures might be used with any combination of applications or modes to enable different functionality or to enable the functionality of the device 10 be programmed in various manners. Once configured as such, the configuration data as selected by the user via the configuration application 158 on the computer 150 can be downloaded to the device 10, either wirelessly or via a wired connection, and stored in the memory 44 thereof and then be used by the operating system of the device 10 to operate.

Figure 16:
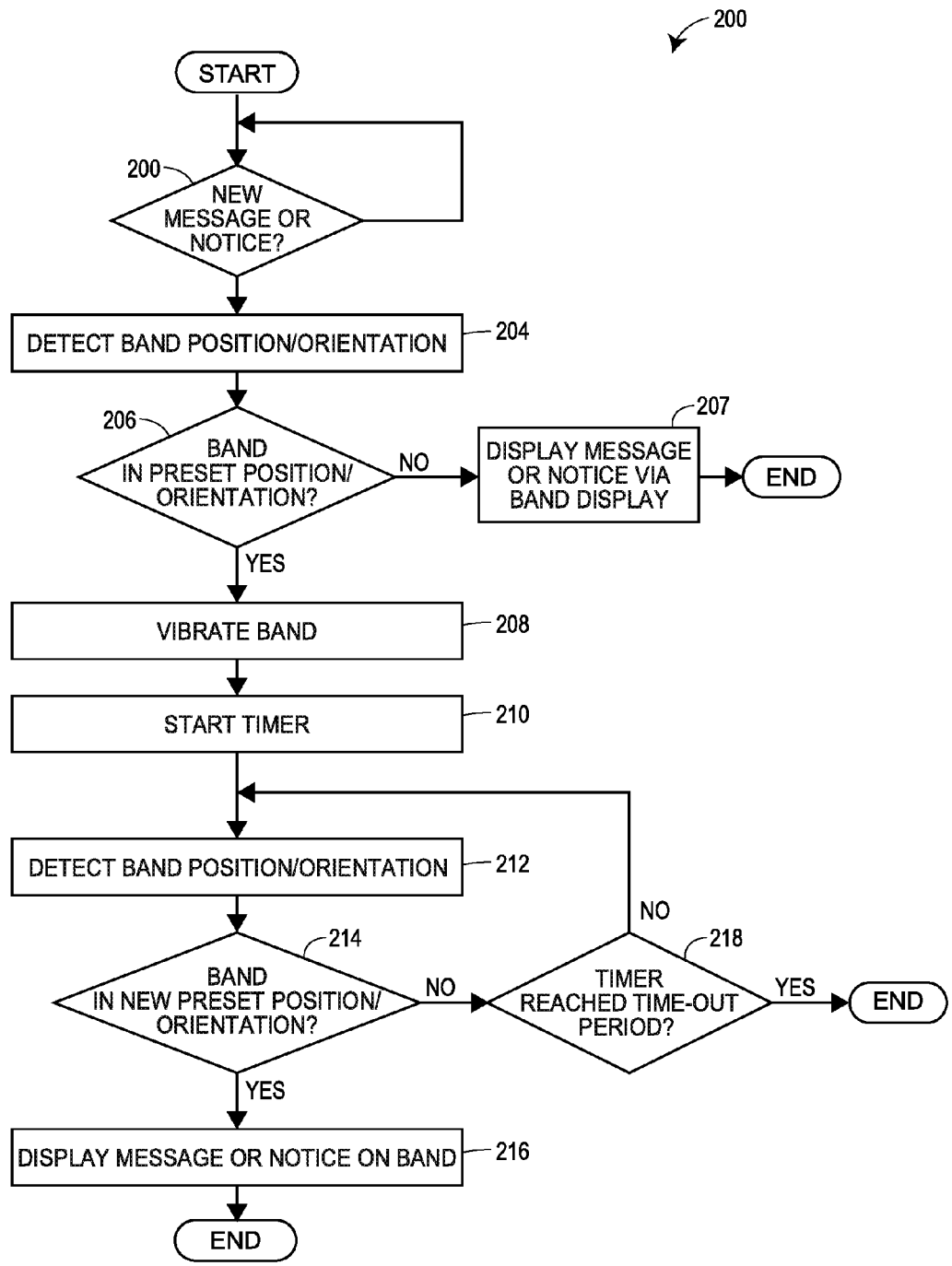
FIG. 16 illustrates a flow chart used by a processor to implement a messaging routine that selectively provides private messages to a user in a discrete manner using natural movements.
Figure 17:
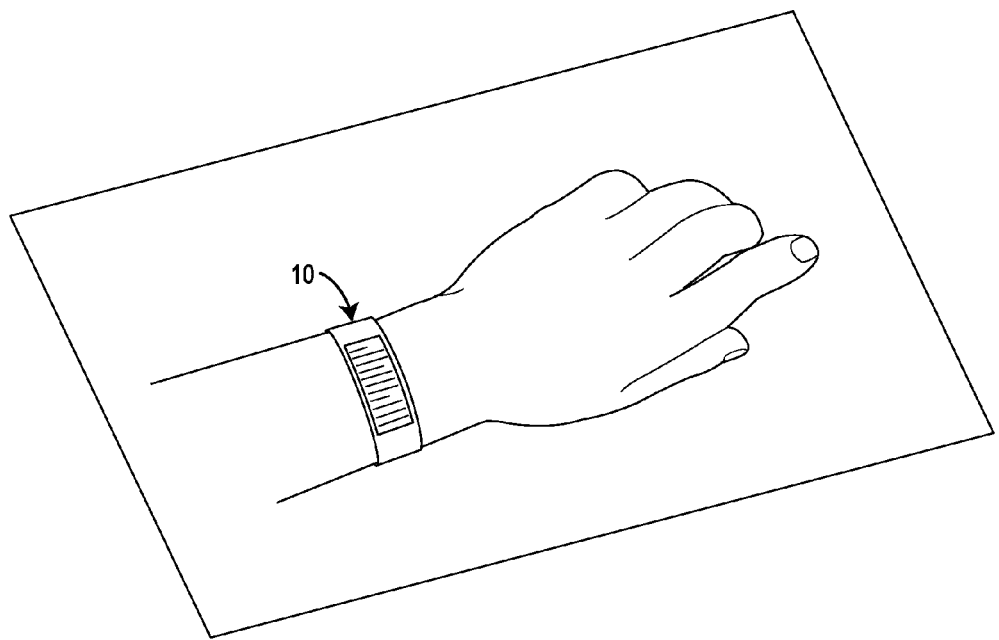
FIG. 17 illustrates a wristband device disposed on a user's wrist when the hand of the wrist is face down in conjunction with implementing the messaging routine of FIG. 16.
Figure 18:
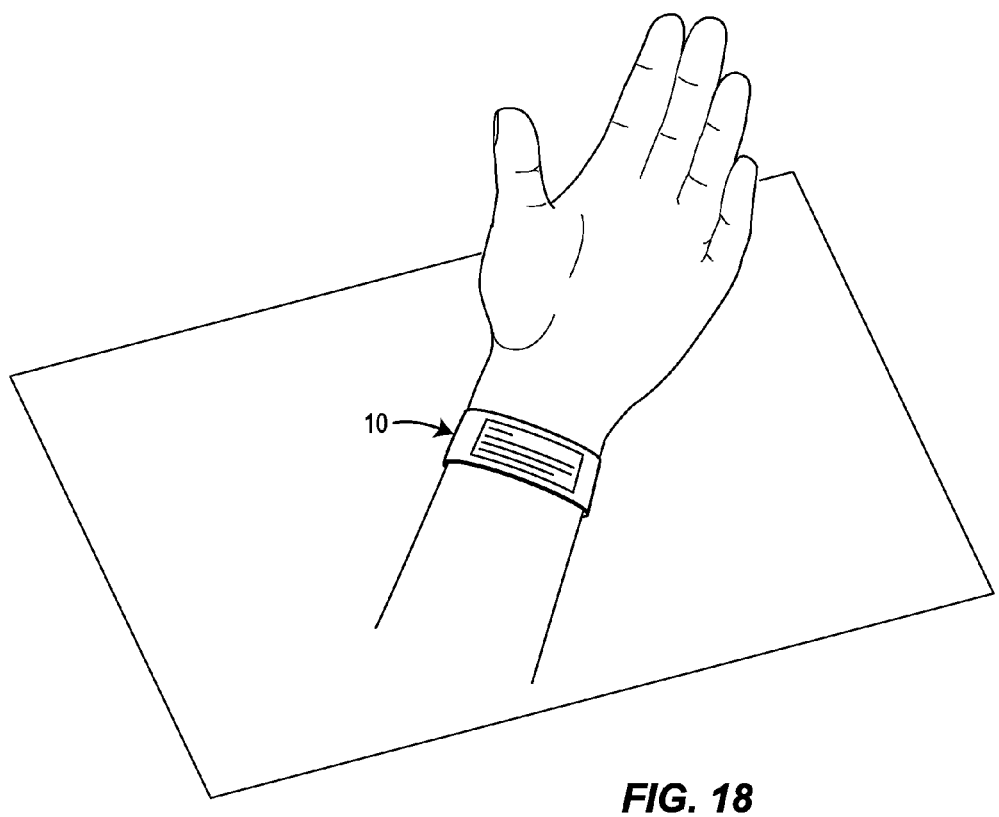
FIG. 18 illustrates the wristband device of FIG. 17 disposed on the wrist of a user's arm when the user has moved his or her hand to place the hand palm up, in conjunction with the messaging routine of FIG. 16.

One example of the manner in which the wristband device 10 could be programmed or could be manufactured to function as a default, is described in more detail with respect to FIGS. 16-18. In this case, the attachable device in the form of a wristband device 10 implements a messaging routine that enables a user of the wristband device 10 to receive, be notified of, and retrieve messages via the wristband device 10 in a very discrete manner using natural motions. Generally speaking, FIG. 16 illustrates a flowchart 200 that may be implemented on a processor of the wristband device 10 to implement a messaging routine using actions (e.g., movements of the wrist) detected by the wristband device 10, as illustrated in one particular example in FIGS. 17 and 18. In this case, the wristband device of FIGS. 16-18 may be any of any of those described above with respect to FIGS. 1-15, in which the device 10 may be attached to or disposed on a user's or wearer's wrist. Still further, the messaging routine described herein may be used to display a private message on the display band at a position of the band that is less publicly viewable, in this case on the bottom or underside of the user's wrist. Of course, the band orientation detection and calibration routine illustrated with respect to FIG. 11 may be used to enable the messaging routine described herein to display a message directly on the bottom of a user's wrist even when the band of the wearable device 10 is adjustable in length.

Generally speaking, the processor of the wristband device 10 may be programmed to perform a messaging routine in which the processor takes a first action, such as causing a mechanical vibration action via the band 10, upon receiving a message or a message notification signal, such as upon receiving an e-mail, a text message, a phone call, an alarm or an alert from a calendar application, etc. Upon taking the first mechanical action, such as vibrating the band 10, the processor of the band 10 sets or starts a timer and waits a specific amount of time, e.g., three seconds, five seconds, etc., during which time the processor detects if a user or wearer of the band 10 takes a predetermined action, such as causing a particular movement of the band 10, entering a particular gesture onto the band 10 via a touchscreen or other user interface on the band 10, or any combination thereof. If the processor of the band 10 detects the predetermined action (such as a predetermined gesture or movement of the band 10) within the predetermined time period, the processor of the band 10 then displays an indication of the message, e-mail, alarm, or other incoming message or displays information about a phone call or other incoming message or signal on the flexible electronic display of the band 10 in, for example, a particular orientation and/or location on the flexible electronic display of the band 10.

This messaging routine can be very useful in providing notifications of messages or other incoming notices to a wearer of the band 10 in a very discrete or private manner that enables the wearer to selectively retrieve and view such messages using, for example, natural motions. As a more particular example, FIG. 16 illustrates a flow chart that may be used by the processor of the band 10 to implement a messaging routine as generally described above, FIG. 17 illustrates the band 10 disposed on a user's or wearer's wrist when the wearer's hand is positioned palm down, as is normally the case with a hand that is resting on a table, a lap, or otherwise, and FIG. 18 illustrates the band 10 disposed on the wrist of the wearer's arm when the wearer has moved his or her hand to place the hand palm up so as to view the display portion of the band 10 disposed on or adjacent the underside or inner portion of the wrist.

In this particular example, and as illustrated by a block 202 of FIG. 16, the messaging routine 200 detects if the wristband device 10 has received a new message or a notification of an incoming message of some sort. The message may be, for example, a text message from a phone, an e-mail message, a calendar alarm or alert or other notification, or any other type of incoming message either from an exterior device (delivered using wireless communications to the band 10) or from another application on the processor or other element of the wristband device 10 itself If no such message has been received at the block 202, control is returned to the block 202 for detection of a new message. However, upon receiving a new message or a notification of the availability of a new message, a block 204 detects the orientation and or positioning of the band device 10 and a block 206 detects if the band is in any of a number of orientations or configurations that make it desirable to continue with the messaging routine. If, the wristband device 10 is in any of a particular number of orientations, such as being disposed with the band 10 being bent around a wrist or other circular member and/or being disposed with the display being face up, as illustrated in FIG. 17, then a block 208 generates a vibrational or other mechanical movement of the band 10 that can be sensed by the wearer to alert the wearer of the existence of a new message. In particular, the block 208 may send one or more signals to a vibration element on the wristband device 10 to cause a vibration of the device 10 that can be felt or detected by the wearer of the wristband device 10. The vibrational movement may be a single vibration, a series of intermittent vibrations in a particular pattern (e.g., two short vibrations, a long vibration, a long vibration and two short vibrations, etc.) or any other desired vibrational movement. Moreover, the pattern of the vibration may indicate the type of message that has been received. That is, for example, one vibrational pattern may indicate the receipt of an incoming e-mail, another vibrational pattern may indicate the receipt of a text message and a still further vibrational pattern may indicate the receipt of a calendar alert. Of course, any desired vibrational pattern may be associated with any type of message and this operation may be set up by the configuration system described with respect to FIG. 15.

Generally speaking, the block 206 may detect whether the band of the device 10 is in one of any number of positions and/or orientations that will cause the device 10 to take the further messaging steps described below. In particular, as one example, the block 206 may first determine if the band of the device 10 is connected in a circle or is disposed around an element (such that the ends of the band are connected together or are disposed adjacent one another), thereby indicating that the band is being worn. If desired, the routine 200 may only be implemented while the device 10 is being worn. Also or instead, if desired, the microprocessor of the device 10 may detect if the device 10 is being worn by a person (as opposed to being, for example, hung on a bar such as a bike handlebar) by detecting a temperature measurement received from a temperature sensor disposed in the electronics unit 19 of the device 10, wherein the temperature sensor is disposed at a location on the band to detect the temperature of the skin of a user. In this case, if the temperature sensor measures a temperature in a range that would be expected (e.g., above 97 degrees Fahrenheit, for example) if the device 10 is being worn by a person, then the block 206 may detect the band of the device 10 as being in the correct orientation or location. Of course, other types of sensors, such as capacitive sensors, may be disposed on the band to contact the wearer's skin and these other sensors may be used to determine if the band is being worn by a person.

Moreover, in addition or instead of detecting whether the device or band 10 is being worn on a human, the block 206 may determine if the band of the device 10 is oriented in a particular direction or orientation. As an example, the block 206 may detect if the band of the device 10 is disposed in an orientation indicating that the band is being worn on a wrist in which the person has their palm face down, such as that illustrated in FIG. 17. Of course, the example orientation of FIG. 17 is but a single example of an orientation that may be detected and used for implementation of the further steps of the messaging routine 200, and a wide range of orientations and positions may be detected as being associated with a position or location or orientation that leads to the implementation the rest of the messaging routine 200 described herein. That is, the orientations of the band of the device 10 used in this messaging routine are not limited to those of FIGS. 17 and 18. Moreover, the messaging routine 200 can be implemented without the steps of the blocks 204 and 206, meaning that the further steps of the messaging routine 200 described herein could be implemented any time that a message or signal is received.

In any event, if the block 206 detects that the band is not in one of the predetermined orientations or positions (e.g., the band is not being worn by a user or is being worn but is not in one of a set of predetermined orientations), then a block 207 may display the message or notice on the flexible electronic display of the device 10 in any usual or desired manner, such as in the manner shown in any of FIGS. 14A-14E. However, as noted above, if the block 206 detects that the device 10 is in a particular use and/or orientation, a block 208 then causes the band or a portion of the band to vibrate in a particular pattern, such as a particular pattern associated with the type of message or incoming signal received.

A block 210 thereafter (or contemporaneously) starts a clock or other timer within the electronics unit of the band. Thereafter, a block 212 again determines the current location or position of the band and a block 214 operates to detect or check for a particular predetermined action of the user via the band, such as particular movement of the device 10, a particular gesture entered into the device 10 via a user interface on the device 10, etc. In one example case, the block 214 may detect a particular, e.g., natural movement of the user's wrist, such as turning the wrist over to place the palm of the hand towards the user, e.g., the motion associated with a user looking at his or her inner wrist, such as that illustrated in FIG. 18. In this case, the block 214 operates to detect the movement of the band or the new position or orientation of the band to determine if the band has moved in a predetermined manner or has been moved to a predetermined position. In another embodiment, the block 214 could detect if a particular gesture has been entered into the band interface, such as a tap or a swipe or a two finger pinch or any other gesture. If the block 214 detects the predetermined movement or gesture or other action by the user, then a block 216 displays an indication of the message (such as the message itself) or displays a screen image provided for reading the message on the display of the device 10. In the particular example being illustrated in FIGS. 17 and 18, the message (such as a text message, a calendar notice, an e-mail, etc.) can be displayed on the display portion of the device 10 disposed on or adjacent to the inner wrist of the wearer, so that this message or notice is only viewable to the wearer when the wearer has his or her hand in the general position indicated in FIG. 18. In this case, for ease of viewing, the message or other information can be displayed in a landscape format as illustrated in FIG. 18. Of course, depending on the type of message, the message or screen image provided by the block 216 could be displayed in other orientations on the flexible electronic display of the device 10, such as in a portrait view, or at an angle to the edges of the band of the device 10, to make the message more readable to the user or wearer of the device 10 based on the actual positioning or orientation of the band of the device 10.

On the other hand, when the block 214 does not determine that the predetermined action has taken place (e.g., movement of the band to a predetermined position or orientation, a gesture entered via the device 10, etc.), a block 218 determines if the time-out period of the timer has been reached. That is, the block 218 may determine if a predetermined time has elapsed since the block 210 set the timer and if not, control is returned to the block 212 to detect the position/orientation of the band (or to determine if a new gesture has been entered into the device 10). Of course, the loop defined by the blocks 212, 214 and 218 may repeat until the block 218 determines that the time-out period has expired without the predetermined action being detected at the block 214, in which case the routine 200 may end without automatically displaying the message or notice of a message on the band 10. In this case, the user may, at a later time, interact with the device 10 to retrieve the message using any known interface application, such as an e-mail, text message, calendar or other application associated with the received message or signal.

As will be understood, the messaging routine 200 described above can be used to provide a very natural and discrete manner of receiving notifications of messages and viewing those messages. Moreover, in some cases, the messaging routine 200 can provide discrete notifications and selective viewing of messages without any direct interaction with the user interface of the device 10 by the wearer. For example, the wearer of the device 10 may be in a meeting or otherwise engaged in conversation or other activities and may receive a message, such as an e-mail, a text message, a reminder, a calendar invite or other notice, etc. In this case, the wearer's hand may be facing down or be in any of a number of other various positions or orientations. However, instead of this message automatically appearing on the display of the device 10 on the outside of the wearer's wrist, where this message may be noticeable to others due to a change in the display, the display becoming brighter, etc., the messaging routine 200 of the device 10 notifies the wearer of the existence of the message (and possibly of the type of message) by causing the band of the device 10 to vibrate, which is generally detectable by the wearer but not others. If the wearer is in a position to or wants read the message, the wearer can simply move his or her wrist to a second predetermined position, such as holding his or her hand up, with the palm facing towards the wearer's face, within the predetermined time from the onset or end of the vibration. This particular motion is a very natural motion and does not appear out of the ordinary to others near wearer. If this motion is made within the predetermined time from the onset or completion of the vibration, the device 10 then displays the message or notice to the user on the flexible electronic display of the device 10 at, for example, only the portion of the flexible electronic display disposed near or adjacent to the inner portion of the wrist, which again is less viewable to others in the room than on the outside wrist portion of the band. However, if the user wants to ignore the message, the user can simply not make the predetermined motion within the predetermined time period, and the message will not appear on the display of the device 10 until the user takes some affirmative action to view the message, such as opening an e-mail, calendar, etc., application on the band 10 at a later time.

Of course, while the messaging content is described herein as coming from or via an application (such as an e-mail application, a text messaging application, etc.) executed on the device 10, the message could be generated by or originate from an application executed on a different device, such as the wearer's phone, computer, etc., and this message could be wirelessly sent to and displayed (or not) on the device 10 as described above.

Moreover, while not specifically illustrated in flowchart 200 of FIG. 16, the user may take, and the device 10 may detect, other actions (such as movements) made by the wearer to perform other functions in conjunction with the messaging routine 200 described above. For example, the wearer may wish to extend the time period for viewing the message by, for example, moving his or her wrist back and forth (or taking some other predetermined action). In this case, the routine 200 may detect this second type of motion and may reset the timer of the device, or may set the timer to a different time (such as by adding 10 seconds) so that, if the wearer takes the first predetermined action within that new extended time period, the message will be displayed on the inner wrist portion of the display. Still further, while the routine 200 is described herein as displaying the message on the portion of the flexible electronic display on the inner wrist, the routine 200 could display the message on any other portion of the flexible electronic display, including on the entire display surface of the flexible electronic display.

Moreover, it will be understood that the actions taken by the user and detected by the device 10 may include any types of actions, including movements of the device 10, gestures or other manual inputs entered into a user interface on the device 10, a predetermined series of movements of the band of the device 10, one or more movements of the device 10 in conjunction with a gesture or other interface interaction, etc. Still further, while the specific example of FIGS. 17-18 detects the location of a wrist with the inner wrist facing away from the user (such as that associated with a hand laying face down) as a position in which to implement the selective delayed messaging notice functions, and detects movement of the wrist to an upright position in which the inner wrist of the band faces the user as an action associated with displaying the message on the band 10, any other positions could be used as the positions associated with or detected by the blocks 206 and 214 of the flowchart of FIG. 16.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for implementing display features via a flexible electronic display on an attachable article as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

The invention claimed is:

1. A system, comprising:
a flexible band having a flexible substrate and a flexible electronic display, the flexible substrate having first and second ends, and the flexible display disposed over a portion of the flexible substrate between the first and second ends;
a display driver electronically connected to the flexible electronic display for providing public and private image content to the flexible electronic display;
a position detection element disposed on or near the flexible band;
one or more processors coupled to the display driver; and
a memory that stores an orientation detection routine that, when executed by the one or more processors, operates to:
instruct a user to take one or more detection initiation actions to activate the position detection element to determine a point on the flexible band using a signal from the position detection element, wherein the determined point on the flexible band is disposed adjacent to a particular point on an exterior object when the flexible band is disposed around the exterior object, and
calibrate the flexible electronic display so that the display driver displays the public image content via the flexible electronic display at one or more positions and displays the private image content via the flexible electronic display at one or more other positions based on the location of the determined point on the band,
wherein the orientation detection routine operates to calibrate the flexible electronic display based on an amount of overlap of the first and second ends of the flexible substrate.

2. The system of claim 1, wherein the position detection element comprises one or more pressure sensors, one or more magnetic sensors, a touchscreen disposed on or near the flexible electronic display, and/or a gyroscopic element.

3. The system of claim 1, wherein the orientation detection routine, when executed by the one or more processors, operates to determine the point on the flexible band by:
using the signal from the position detection element by determining the amount of overlap of the first and second ends of the flexible ban; or
using the signal from the position detection element indicative of a touch event applied to the flexible band; or
presenting a message to a user via the flexible electronic display to touch the flexible band at a position adjacent the particular point on the exterior object; or
presenting a message to a user via the flexible electronic display to touch the flexible band at a position adjacent the bottom of the user's wrist.

4. The system of claim 1, wherein the orientation detection routine, when executed by the one or more processors, either:
operates to calibrate the flexible electronic display so that the display driver displays the public image content and the private image content on the flexible electronic display using a display screen having a fixed reference point determined based on the determined point on the flexible band; or
operates to calibrate the flexible electronic display so that the display driver displays the public image content and the private image content on the flexible electronic display using a display screen centered on the determined point on the flexible band; or
operates to calibrate the flexible electronic display so that the display driver sizes a display screen based on the distance from the determined point to a fixed position on the flexible band.

5. The system of claim 1, wherein the flexible band and the position detection element are included in an attachable article.

6. The system of claim 5, wherein the memory that stores the orientation detection routine is included in one or more other devices in communicative connection with the attachable article.

7. A method of calibrating a flexible electronic display disposed on a flexible substrate, the flexible substrate having first and second ends, that is adjustably attachable around an exterior object, comprising:
detecting, using one or more processors, a point on the flexible substrate that is disposed adjacent to a particular point on an exterior object when the flexible substrate is disposed at least partially around the exterior object;
calibrating, using the one or more processors, the flexible electronic display based on the detected point and on an amount of overlap of the first and second ends of the flexible substrate;
displaying public image content on the flexible electronic display at one or more positions on the flexible electronic display using the flexible electronic display calibrated based on the detected point on the flexible substrate, and
displaying private image content on the flexible electronic display at one or more other positions on the flexible electronic display using the flexible electronic display calibrated based on the detected point on the flexible substrate.

8. The method of claim 7, wherein detecting, using the one or more processors, the point on the flexible substrate that is disposed adjacent to the particular point on the exterior object includes:
detecting the point on the flexible substrate when the first and second ends of the flexible substrate are disposed in an overlapping manner around the exterior object; and/or
using one or more pressure sensors to detect the point on the flexible substrate;
and/or using one or more magnetic sensors to detect the point on the flexible substrate;
and/or using a touchscreen input device to detect the point on the flexible substrate; and/or
determining the amount of overlap of first and second ends of the flexible substrate; and/or
determining the point based on a location of a touch event applied to the flexible electronic display; and/or
presenting a message to a user via the flexible electronic display to touch the flexible substrate at a position adjacent the particular point on the exterior object.

9. The method of claim 7, wherein calibrating, using the one or more processors, the flexible electronic display based on the detected point includes configuring the flexible electronic display to display the public image content and the private image content via a display screen having a fixed reference point determined based on the detected point on the flexible substrate.

10. The method of claim 7, wherein calibrating, using of the one or more processors, the flexible electronic display includes centering the public image content and/or the private image content, via an electronics module, on the flexible electronic display based on the detected point on the flexible substrate.

11. A system, comprising:
a flexible band having a flexible substrate and a flexible electronic display disposed over a portion of the flexible substrate, the flexible band having first and second ends;
a clasping mechanism coupled to the flexible band that is adjustable so as to enable overlap of the first and second ends of the flexible band by differing amounts;
an electronics module electronically connected to the flexible electronic display and attached onto the flexible band at one or more fixed locations for providing public and private image content to the flexible electronic display, the electronics module including a processor, a display driver and a memory;
one or more sensors disposed within the flexible band, the clasping mechanism or the electronics module; and
an orientation detection and calibration routine stored in one or more memories that, when executed by one or more processors, operates to:
instruct a user to take one or more detection initiation actions with respect to the flexible band;
determine a point on the flexible band using a signal from the one or more sensors in response to the one or more detection initiation actions; and
calibrate the flexible electronic display so that the display driver displays public image content via the flexible electronic display at one or more positions on the flexible electronic display and displays private image content via the flexible electronic display at one or more other positions based on the determined point on the flexible band, wherein the orientation detection routine operates to calibrate the flexible electronic display based on an amount of overlap of the first and second ends of the flexible band.

12. The system of claim 11, wherein the flexible band, the flexible electronic display, the clasping mechanism, the electronics module, and the one or more sensors are included in an adjustable flexible electronic display device.

13. The system of claim 12, wherein at least one of the one or more processors is included in one or more other devices in communicative connection with the adjustable flexible electronic display device, and wherein the at least one of the one or more processors of the one or more other devices executes at least a respective portion of the orientation detection and calibration routine.

14. The system of claim 11, wherein the processor of the electronics module attached onto the flexible band executes at least a respective portion of the orientation detection and calibration routine.

15. The system of claim 11, wherein the one or more sensors includes one or more pressure sensors, one or more magnetic sensors, a touchscreen interface disposed on or near the flexible electronic display, and/or a gyroscopic sensor.

16. The system of claim 11, wherein the orientation detection and calibration routine, when executed by the one or more processors, operates to determine the point on the flexible band by:
using the signal from the one or more sensors by determining the amount of overlap of the first and second ends of the flexible band; or
using the signal from the one or more sensors by determining a location of a touch event applied to the flexible electronic display.

17. The system of claim 11, wherein the orientation detection and calibration routine, when executed by the one or more processors, instructs the user to take the one or more detection initiation actions with respect to the flexible band by instructing the user to:
touch the flexible band either at a position adjacent to a particular point on an exterior object or at a position adjacent the bottom of the user's wrist; or
move the flexible band in a particular manner; or
orient the flexible band in a particular manner.

18. The system of claim 11, wherein the orientation detection and calibration routine, when executed by the one or more processors, calibrates the flexible electronic display so that the display driver displays the public image content and the private image content via a display screen on the flexible electronic display having a fixed reference point determined based on the location of the determined point on the flexible band.

19. The system of claim 11, wherein the orientation detection and calibration routine, when executed by the one or more processors, calibrates the flexible electronic display so that:
the display driver displays the public image content and/or the private image content via a display screen centered at the determined point on the flexible band; or
the display driver sizes a display screen based on the distance from the determined point to a fixed position on the flexible band.

20. The system of claim 1, wherein the orientation detection routine determines the one or more positions at which the public image content is displayed and determines the one or more positions at which the private image content is displayed.

21. The system of claim 11, wherein the one or more sensors is disposed in the clasping mechanism.

* * * * *